United States Patent
Won et al.

(10) Patent No.: US 11,483,638 B2
(45) Date of Patent: Oct. 25, 2022

(54) DISPLAY DEVICE AND METHOD OF DRIVING THE SAME

(71) Applicant: Samsung Display Co., Ltd., Yongin-si (KR)

(72) Inventors: Byeong Hee Won, Incheon (KR); Joon Hak Oh, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/732,692

(22) Filed: Jan. 2, 2020

(65) Prior Publication Data

US 2020/0296493 A1 Sep. 17, 2020

(30) Foreign Application Priority Data

Mar. 15, 2019 (KR) .................. 10-2019-0029944

(51) Int. Cl.
| | |
|---|---|
| *H04R 1/02* | (2006.01) |
| *H04M 1/02* | (2006.01) |
| *H04M 1/03* | (2006.01) |
| *H04R 1/28* | (2006.01) |
| *H04R 3/00* | (2006.01) |

(52) U.S. Cl.
CPC .......... *H04R 1/025* (2013.01); *H04M 1/0266* (2013.01); *H04M 1/03* (2013.01); *H04R 1/2819* (2013.01); *H04R 3/00* (2013.01); *H04M 2201/38* (2013.01); *H04R 2400/03* (2013.01); *H04R 2499/15* (2013.01)

(58) Field of Classification Search
CPC .......... H04R 1/02; H04R 1/025; H04R 1/026

USPC ................................. 381/333, 388
See application file for complete search history.

(56) References Cited

U.S. PATENT DOCUMENTS

| | | | | | |
|---|---|---|---|---|---|
| 6,003,766 | A | * | 12/1999 | Azi ..................... | B42D 15/022 235/379 |
| 6,332,029 | B1 | * | 12/2001 | Azima .................. | H04R 1/021 381/152 |
| 6,731,764 | B2 | * | 5/2004 | Asada ..................... | H04R 5/02 381/152 |
| 6,985,596 | B2 | * | 1/2006 | Bank ..................... | H04R 17/00 381/152 |
| 7,149,318 | B2 | * | 12/2006 | Bank ..................... | H04R 1/028 381/190 |
| 7,194,099 | B2 | * | 3/2007 | Lewis ..................... | H04M 1/03 381/182 |
| 7,254,248 | B2 | * | 8/2007 | Johannsen ............. | H04M 1/03 381/409 |
| 2010/0008523 | A1 | * | 1/2010 | Demuynck ......... | H04M 1/0241 381/182 |

(Continued)

FOREIGN PATENT DOCUMENTS

| | | |
|---|---|---|
| KR | 1020200089781 | 7/2020 |
| KR | 1020200110562 | 9/2020 |

*Primary Examiner* — Suhan Ni

(74) *Attorney, Agent, or Firm* — Cantor Colburn LLP

(57) ABSTRACT

A display device includes: a display panel; a bracket disposed under the display panel; a first vibration generator disposed under the display panel, where the first vibration generator outputs sound by vibrating the display panel in a thickness direction of the display panel; and a second vibration generator disposed under the bracket, where the second vibration generator outputs horizontal vibrations by vibrating the bracket in a horizontal direction perpendicular to the thickness direction.

20 Claims, 32 Drawing Sheets

(56) References Cited

U.S. PATENT DOCUMENTS

| | | | |
|---|---|---|---|
| 2010/0111334 A1* | 5/2010 | Simokawatoko | H04R 9/046 |
| | | | 381/182 |
| 2019/0037164 A1* | 1/2019 | Kim | H04R 17/005 |
| 2020/0177979 A1* | 6/2020 | Cho | H04M 1/0266 |
| 2020/0233469 A1 | 7/2020 | Won et al. | |
| 2020/0296496 A1 | 9/2020 | Im et al. | |

* cited by examiner

↑ POLARITY DIRECTION

FIG. 11
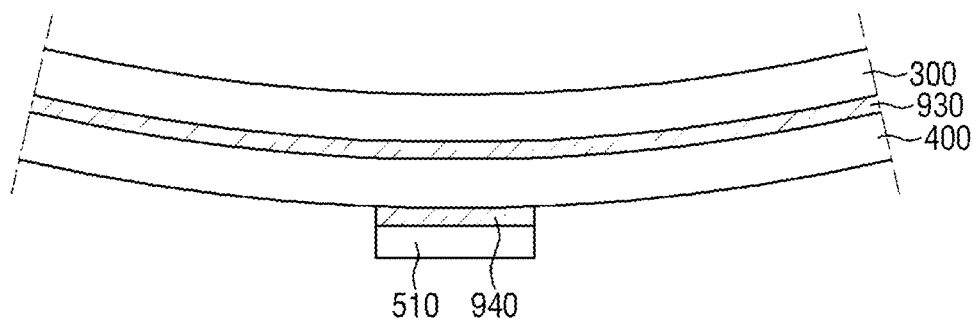
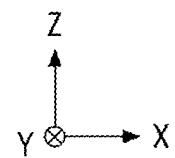

FIG. 12
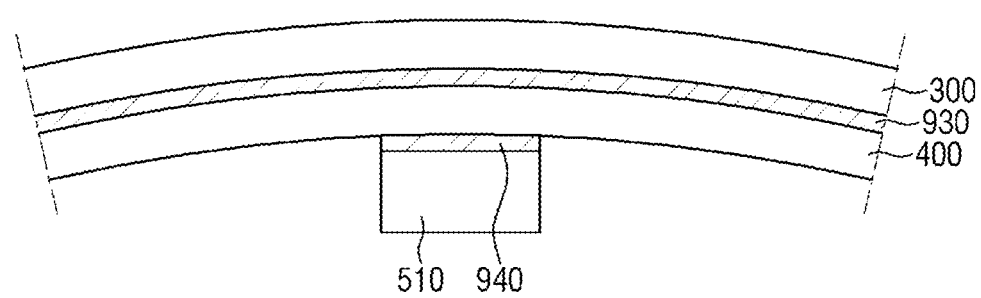
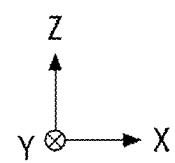

DISPLAY DEVICE AND METHOD OF DRIVING THE SAME

This application claims priority to Korean Patent Application No. 10-2019-0029944, filed on Mar. 15, 2019, and all the benefits accruing therefrom under 35 U.S.C. § 119, the content of which in its entirety is herein incorporated by reference.

BACKGROUND

1. Field

The disclosure relates to a display device and a method of driving the same.

2. Description of the Related Art

Recently, display devices for displaying images are widely used in various field with development of information technology. For example, display devices are being applied to various electronic devices such as smartphones, digital cameras, notebook computers, navigation devices, and smart televisions. A display device may include a display panel for displaying an image and a vibration generator for providing sound.

SUMMARY

When display devices are applied to various electronic devices, display devices having wide design freedom are desired. For example, in the case of a smartphone, a display device having a wider display area by removing a vibration generator disposed on a front surface of the display device to output the other party's voice in a call mode is required.

Embodiments of the disclosure provide a display device which outputs sound using a vibration generator not exposed to the outside and vibrates in a horizontal direction through a vibration generator vibrating in a vertical direction.

Embodiments of the disclosure also provide a method of driving a display device which outputs sound using a vibration generator not exposed to the outside and vibrates in a horizontal direction through a vibration generator vibrating in a vertical direction.

However, embodiments of the disclosure are not restricted to the one set forth herein. The above and other features of the disclosure will become more apparent to one of ordinary skill in the art to which the disclosure pertains by referencing the detailed description of the disclosure given below.

According to an exemplary embodiment, a display device includes: a display panel; a bracket disposed under the display panel; a first vibration generator disposed under the display panel, where the first vibration generator outputs sound by vibrating the display panel in a thickness direction of the display panel; and a second vibration generator disposed under the bracket, where the second vibration generator outputs horizontal vibrations by vibrating the bracket in a horizontal direction perpendicular to the thickness direction.

BRIEF DESCRIPTION OF THE DRAWINGS

These and/or other features of the invention will become apparent and more readily appreciated from the following description of the embodiments, taken in conjunction with the accompanying drawings, in which:

FIGS. 11 and 12 illustrate a method of vibrating a display panel in a Z-axis direction through the vibration of the first vibration generator;

DETAILED DESCRIPTION

Figure 1:
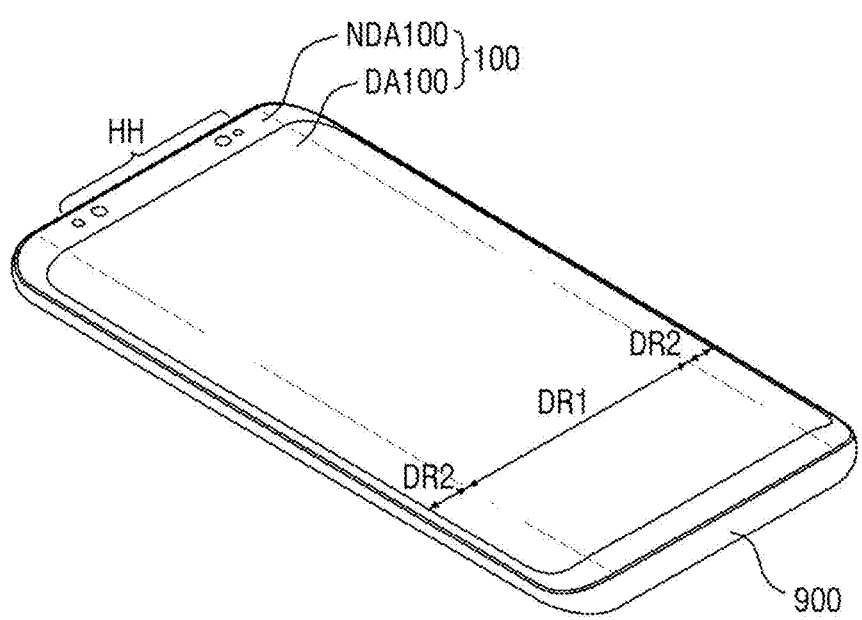
FIG. 1 is a perspective view of a display device according to an embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. "Or" means "and/or." "At least one of A and B" means "A and/or B." As used herein, the term "and/or" includes any and all combinations of one or more of the associated listed items. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as a pressure sensing unit and a touch driving unit. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the invention will be described with reference to the attached drawings.

Figure 2:
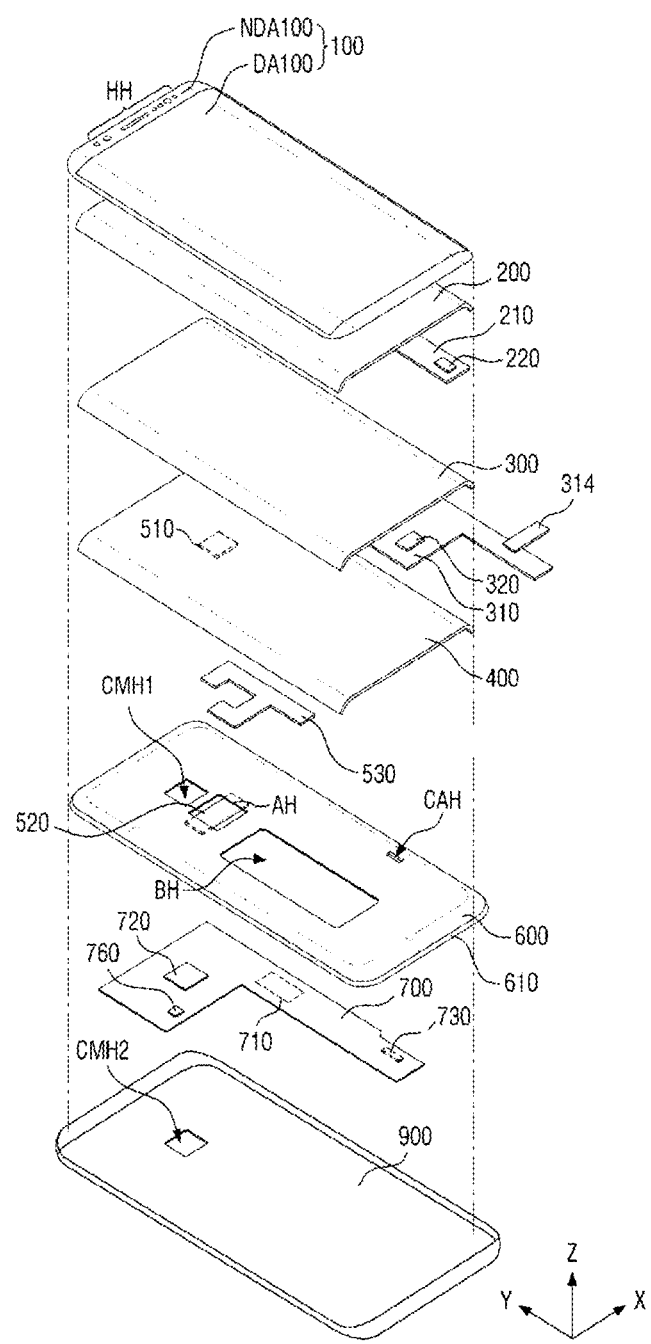
FIG. 2 is an exploded perspective view of the display device of FIG. 1.

FIG. 1 is a perspective view of a display device 10 according to an embodiment FIG. 2 is an exploded perspective view of the display device 10 of FIG. 1.

Referring to FIGS. 1 and 2, an embodiment of the display device 10 includes a cover window 100, a touch sensing device 200, a touch circuit board 210, a touch driver 220, a display panel 300, a display circuit board 310, a display driver 320, an under-panel member 400, a first vibration generator 510, a second vibration generator 520, a bracket 600, a main circuit board 700, and a lower cover 900.

Herein, the terms "above", "top" and "upper surface" indicate a direction in which the cover window 100 is disposed with respect to the display panel 300, that is, a Z-axis direction, and the terms "below," "bottom" and "lower surface" indicate a direction in which the bracket 600 is disposed with respect to the display panel 300, that is, a direction opposite to the Z-axis direction. In addition, "left," "right," "upper" and "lower" indicate directions when the display panel 300 is viewed in a plane. For example, "left" indicates a direction opposite to an X-axis direction, "right" indicates the X-axis direction, "upper" indicates the Z-axis direction, and "lower" indicates the direction opposite to the Z-axis direction.

The display device 10 may be rectangular in a plan view. In one embodiment, for example, the display device 10 may have a rectangular planar shape having short sides in a first direction (X-axis direction) and long sides in a second direction (Y-axis direction) as illustrated in FIGS. 1 and 2. Each corner where a short side extending in the first direction (X-axis direction) meets a long side extending in the second direction (Y-axis direction) may be round with a predetermined curvature or may be right-angled. The planar shape of the display device 10 is not limited to the rectangular shape, but may also be variously modified to have another polygonal shape, a circular shape, or an elliptical shape.

The display device 10 may include a first area DR1, which is flat, and a second area DR2 extending from right and left sides of the first area DR1. The second area DR2 may be flat or curved. In an embodiment, where the second area DR2 is flat, an angle formed by the first area DR1 and the second area DR2 may be an obtuse angle. In an alternative embodiment, where the second area DR2 is curved, the second area DR2 may have a constant curvature or a varying curvature.

In an embodiment, as shown in FIG. 1, the second area DR2 extends from each of the right and left sides of the first area DR1. However, embodiments are not limited to this case. Alternatively, the second area DR2 may also extend from only one of the right and left sides of the first area DR1. Alternatively, the second area DR2 may extend not only from the right and left sides of the first area DR1 but also from at least any one of upper and lower sides of the first area DR1. Hereinafter, embodiments where the second area DR2 is disposed at right and left edges of the display device 10 will be mainly described for convenience of description.

Figure 6:
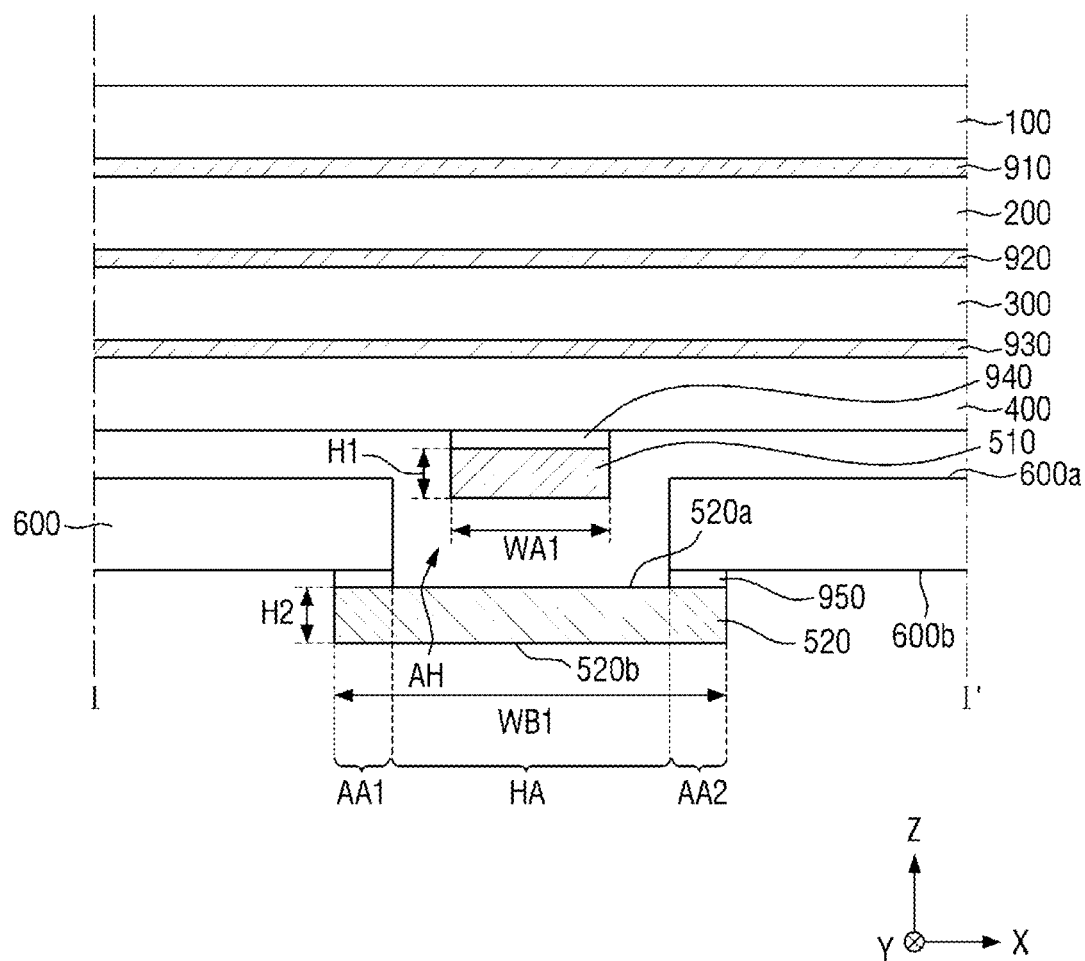
FIG. 6 is a cross-sectional view taken along line I-I' of FIGS. 3 and 4.

The cover window 100 may be disposed above the display panel 300 to cover an upper surface of the display panel 300. Thus, the cover window 100 may function to protect the upper surface of the display panel 300. The cover window 100 may be attached to the touch sensing device 200 by a first adhesive member 910 as illustrated in FIG. 6. The first adhesive member 910 may be an optically clear adhesive film ("OCA") or an optically cleared resin ("OCR").

The cover window 100 may include a transmissive portion DA100 corresponding to the display panel 300 and a light shielding portion NDA100 corresponding to an area other than the display panel 300. The cover window 100 may be disposed in the first area DR1 and the second areas DR2. The transmissive portion DA100 may be disposed in a part of the first area DR1 and a part of each of the second areas DR2. The light shielding portion NDA 100 may be formed opaque. Alternatively, the light shielding portion NDA100 may function as a decorative layer having a pattern that can be seen by a user when an image is not displayed. In one embodiment, for example, the light shielding portion NDA100 may be patterned with a company's logo or various characters. In addition, holes HH for exposing a front camera, an iris recognition sensor, an illuminance sensor, etc. may be defined in the light shielding portion NDA100. However, embodiments are not limited to this case. In one embodiment, for example, some or all of the front camera, the iris recognition sensor, and the illuminance sensor may be embedded in the display panel 300, in which case some or all of the holes HH may be removed.

The cover window 100 may include or be made of glass, sapphire, and/or plastic. The cover window 100 may be rigid or flexible.

The touch sensing device 200 may be disposed between the cover window 100 and the display panel 300. The touch sensing device 200 may be disposed in the first area DR1 and the second areas DR2. Therefore, a user's touch may be sensed not only in the first area DR1 but also in the second areas DR2.

The touch sensing device 200 may be attached to a lower surface of the cover window 100 by the first adhesive member 910 as illustrated in FIG. 6. A polarizing film may be additionally disposed on the touch sensing device 200 to prevent reflection of external light, which may cause decrease in visibility. In an embodiment, the polarizing film may be attached to the lower surface of the cover window 100 by the first adhesive member 910.

The touch sensing device 200 is a device for sensing a user's touch position and may be implemented as a capacitance type such as a self-capacitance type or a mutual capacitance type. In an embodiment, where the touch sensing device 200 is implemented as a capacitance type, the touch sensing device 200 may include only touch driving electrodes. In an alternative embodiment, where the touch sensing device 200 is implemented as a mutual capacitance type, the touch sensing device 200 may include touch driving electrodes and touch sensing electrodes. Hereinafter, embodiments where the touch sensing device 200 implemented as a mutual capacitance type will be mainly described for convenience of description.

In an embodiment, the touch sensing device 200 may be in a form of a panel or a film. In such an embodiment, the touch sensing device 200 may be attached onto a thin-film encapsulation layer of the display panel 300 by a second adhesive member 920 as illustrated in FIG. 6. The second adhesive member 920 may be an OCA or an OCR.

Alternatively, the touch sensing device 200 may be formed integrally with the display panel 300. In such an embodiment, the touch driving electrodes and the touch sensing electrodes of the touch sensing device 200 may be formed on the thin-film encapsulation layer of the display panel 300 or may be formed on an encapsulation substrate or an encapsulation film covering a light emitting element layer of the display panel 300.

Figure 3:
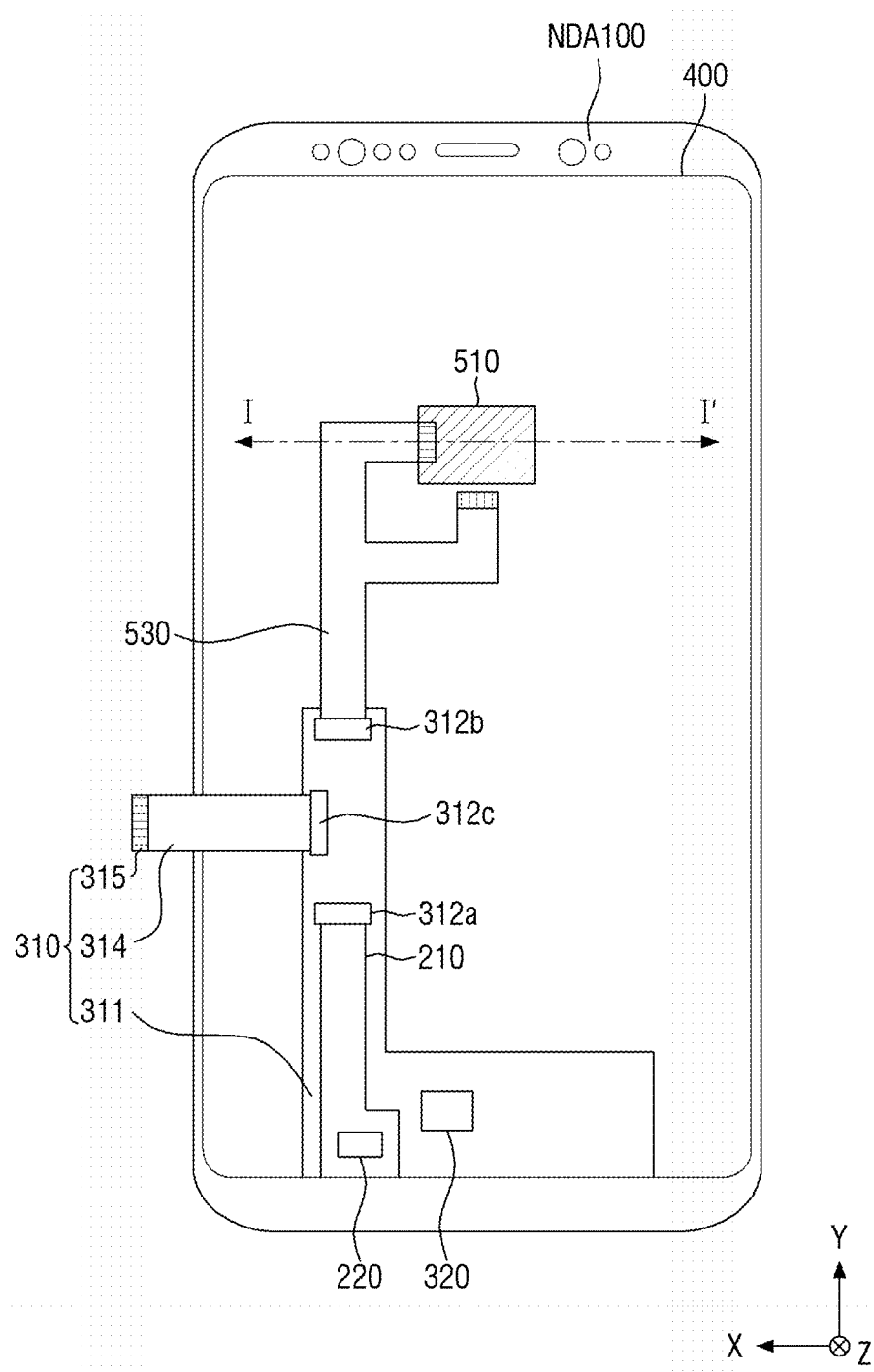
FIG. 3 is a bottom view of an exemplary embodiment of a cover window, a touch circuit board, a display circuit board, an under-panel member, a first vibration generator and a vibration circuit board of FIG. 2.

The touch circuit board 210 may be attached to a side portion of the touch sensing device 200. In an embodiment, an end portion of the touch circuit board 210 may be attached onto pads disposed on a side portion of the touch sensing device 200 using an anisotropic conductive film. In an embodiment, a touch connection portion may be provided at another end portion of the touch circuit board 210. The touch connection portion may be connected a touch connector 312a of the display circuit board 310 as illustrated in FIG. 3. The touch circuit board 210 may be a flexible printed circuit board.

The touch driver 220 may transmit touch driving signals to the touch driving electrodes of the touch sensing device 200, detect sensing signals from the touch sensing electrodes of the touch sensing device 200, and calculate a user's touch position by analyzing the sensing signals. The touch driver 220 may be in a form of an integrated circuit and mounted on the touch circuit board 210.

The display panel 300 may be disposed under the touch sensing device 200. The display panel 300 may overlap the transmissive portion 100DA of the cover window 100 when viewed from a plan view in a thickness direction of the display panel 300 or the Z-axis direction. The display panel 300 may be disposed in the first area DR1 and the second areas DR2. Therefore, an image of the display panel 300 may be seen not only in the first area DR1 but also in the second areas DR2.

The display panel 300 may be a light emitting display panel including light emitting elements. In one embodiment, for example, the display panel 300 may be an organic light emitting display panel using organic light emitting diodes, a micro light emitting diode display panel using micro light emitting diodes, or a quantum dot light emitting display panel including quantum dot light emitting diodes.

The display panel 300 may include a substrate, a thin-film transistor layer disposed on the substrate, the light emitting element layer, and the thin-film encapsulation layer.

In an embodiment, where the display panel 300 is implemented to be flexible, the display panel 300 may include or be made of plastic. In such an embodiment, the substrate may include a flexible substrate and a support substrate. The support substrate for supporting the flexible substrate may have less flexibility than the flexible substrate. Each of the flexible substrate and the support substrate may include a polymer material having flexibility. In one embodiment, for example, each of the flexible substrate and the support substrate may include polyethersulphone ("PES"), polyacrylate ("PA"), polyarylate ("PAR"), polyetherimide ("PEI"), polyethylene naphthalate ("PEN"), polyethylene terepthalate ("PET"), polyphenylene sulfide ("PPS"), polyallylate, polyimide ("PI"), polycarbonate ("PC"), cellulose triacetate ("CAT"), cellulose acetate propionate ("CAP"), or a combination of these materials.

The thin-film transistor layer is disposed on the substrate. The thin-film transistor layer may include scan lines, data lines, and thin-film transistors. Each of the thin-film transistors includes a gate electrode, a semiconductor layer, and source and drain electrodes. In an embodiment, where a scan driver is formed directly on the substrate, the scan driver may be formed together with the thin-film transistor layer.

The light emitting element layer is disposed on the thin-film transistor layer. The light emitting element layer includes anodes, a light emitting layer, a cathode, and banks. The light emitting layer may include an organic light emitting layer including an organic material. In one embodiment, for example, the light emitting layer may include a hole injection layer, a hole transporting layer, an organic light emitting layer, an electron transporting layer, and an electron injection layer. Alternatively, the hole injection layer and the electron injection layer may be omitted. When a voltage is applied to the anodes and the cathode, holes and electrons move to the organic light emitting layer through the hole transporting layer and the electron transporting layer, respectively, and combine together in the organic light emitting layer, thereby emitting light. The light emitting element layer may be a pixel array layer in which pixels are included. Thus, an area in which the light emitting element layer is disposed may define a display area for displaying an image. An area around the display area may define a non-display area.

The thin-film encapsulation layer is disposed on the light emitting element layer. The thin-film encapsulation layer effectively prevents penetration of oxygen or moisture into the light emitting element layer. The thin-film encapsulation layer may include an inorganic layer and an organic layer.

The display circuit board 310 may be attached to a side portion of the display panel 300. In an embodiment, an end portion of the display circuit board 310 may be attached onto pads provided on a side portion of the display panel 300 using an anisotropic conductive film. The display circuit board 310 may be bent toward a lower surface of the display panel 300. The touch circuit board 210 may also be bent toward the lower surface of the display panel 300. Therefore, the touch connection portion provided at an end portion of the touch circuit board 210 may be connected to the touch connector 312a of the display circuit board 310. The display circuit board 310 will be described later in greater detail with reference to FIG. 3.

The display driver 320 outputs signals and voltages for driving the display panel 300 through the display circuit board 310. The display driver 320 may be in a form of an integrated circuit and mounted on the display circuit board 310. However, embodiments are not limited to this case. In one embodiment, for example, the display driver 320 may be attached directly onto the substrate of the display panel 300. In such an embodiment, the display driver 320 may be attached to an upper or lower surface of the substrate of the display panel 300.

The under-panel member 400 may be disposed under the display panel 300. The under-panel member 400 may be attached to the lower surface of the display panel 300 by a third adhesive member 930 as illustrated in FIG. 6. The third adhesive member 930 may be an OCA or an OCR.

The under-panel member 400 may include at least one of a light absorbing member for absorbing light incident from an outside, a buffer member for absorbing external impact, a heat dissipating member for efficiently dissipating the heat of the display panel 300, and a light shielding layer for blocking light incident from the outside.

The light absorbing member may be disposed under the display panel 300. The light absorbing member blocks transmission of light to prevent elements disposed under the light absorbing member, e.g., the first vibration generator 510, the display circuit board 310, etc. from being seen from above the display panel 300. The light absorbing member may include a light absorbing material such as a black pigment or a dye.

The buffer member may be disposed under the light absorbing member. The buffer member absorbs external impact to prevent the display panel 300 from being damaged. The buffer member may be composed of a single layer or a plurality of layers. In one embodiment, for example, the buffer member may include or be made of a polymer resin such as polyurethane, polycarbonate, polypropylene or polyethylene or may be made of an elastic material such as a sponge formed by foaming a rubber, a urethane-based material or an acrylic-based material. The buffer member may be a cushion layer.

The heat dissipating member may be disposed under the buffer member. The heat dissipating member may include a first heat dissipating layer containing graphite or carbon nanotubes and a second heat dissipating layer including or formed of a metal thin film (such as copper, nickel, ferrite or silver) capable of shielding electromagnetic waves and having high thermal conductivity.

The first vibration generator 510 may be disposed under the under-panel member 400. The first vibration generator 510 may be attached to a lower surface of the under-panel member 400 by a fourth adhesive member 940 as illustrated in FIG. 6. The fourth adhesive member 940 may be a pressure sensitive adhesive ("PSA").

In an embodiment, each of the first vibration generator 510 and the second vibration generator 520 may include a piezo actuator. In such an embodiment, each of the first vibration generator 510 and the second vibration generator 520 may vibrate by contracting and expanding the piezo actuator by applying an alternating current ("AC") voltage. The first vibration generator 510 and the second vibration generator 520 may vibrate in a vertical direction (Z-axis direction). In such an embodiment, the display panel 300 may be vibrated upwardly and downwardly by the vibration of the first vibration generator 510, thereby outputting sound. In such an embodiment, the bracket 600 may be vibrated from side to side by the vibration of the second vibration generator 520 and may transmit horizontal vibrations to the display device 10.

The first vibration generator 510 and the second vibration generator 520 may be connected to a vibration circuit board 530. In an embodiment, the vibration circuit board 530 may be connected to pad electrodes provided on at least one side portion of the first vibration generator 510 and pad electrodes provided on at least one side portion of the second vibration generator 520. At least a part of the vibration circuit board 530 may be disposed through an accommodating hole AH to be electrically connected to the second vibration generator 520. However, embodiments are not limited to this case, and a separate through hole may be additionally provided.

A vibration connection portion may be disposed on a side portion of the vibration circuit board 530. The vibration connection portion may be connected to a vibration connector 312b of the display circuit board 310 as illustrated in FIG. 3. The vibration circuit board 530 may be a flexible printed circuit board.

The bracket 600 may be disposed under the under-panel member 400. The bracket 600 may include a synthetic resin, a metal, or a combination thereof.

A first camera hole CMH1, into which a camera device 720 is inserted, a battery hole BH for dissipating the heat of a battery, and a through hole CAH through which a connection cable 314 connected to the display circuit board 310 passes are defined through the bracket 600. In such an embodiment, the accommodating hole AH for accommodating the first vibration generator 510 may further be defined through the bracket 600. A width of the accommodating hole AH may be greater than that of the first vibration generator 510. In some embodiments, when a height of the first vibration generator 510 is not great, an accommodating groove may be formed in the bracket 600 instead of the accommodating hole AH. The accommodating hole AH may be spaced apart from the battery hole BH, or may be integrally formed with or connected to the battery hole BH.

If the first vibration generator 510 overlaps the battery hole BH in which the battery is disposed, it may be affected by the heat of the battery. Therefore, in an embodiment, the first vibration generator 510 may be disposed not to overlap the battery hole BH.

The second vibration generator 520 may be disposed on a lower surface of the bracket 600 to overlap the accommodating hole AH. A width of the second vibration generator 520 may be greater than that of the accommodating hole AH. That is, an end and another end portion of the second vibration generator 520 may be attached to the lower surface of the bracket 600 adjacent to the accommodating hole AH, and an area between the ends of the second vibration generator 520 may overlap the accommodating hole AH.

The ends of the second vibration generator 520 may be attached to the bracket 600 adjacent to the accommodating hole AH to output vibrations. That is, the second vibration generator 520 may include a single hole area and two attachment areas. The attachment structure of the second vibration generator 520 will be described later in greater detail with reference to FIG. 5.

The second vibration generator 520 may vibrate in the vertical direction (Z-axis direction), and the bracket 600 may vibrate in a horizontal direction (X-Y-axis direction) due to the vertical vibration of the second vibration generator 520. A method of vibrating the bracket 600 in the horizontal direction using the second vibration generator 520 will be described later in greater detail with reference to FIGS. 13 through 15.

Figure 4:
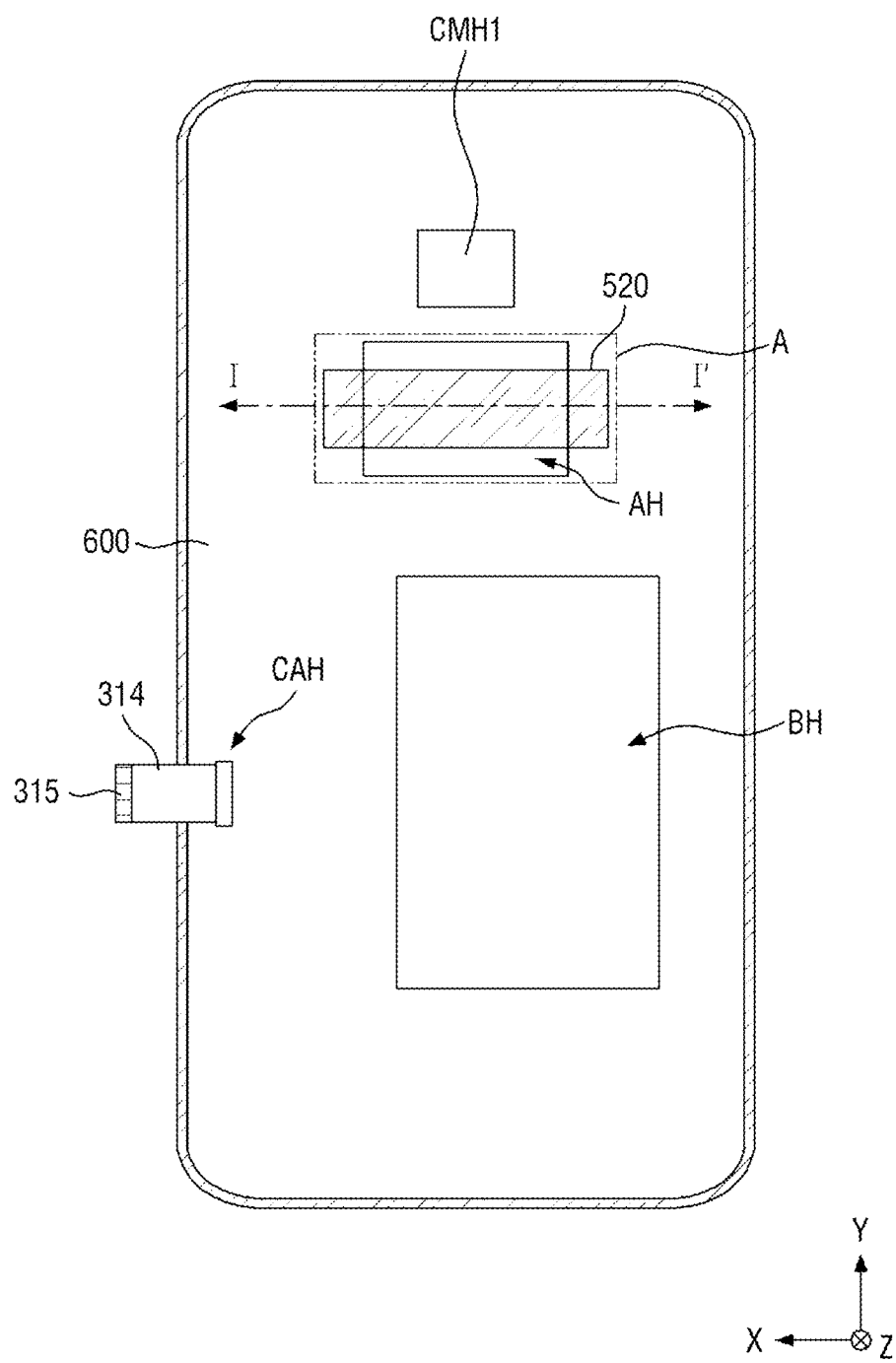
FIG. 4 is a bottom view of an exemplary embodiment of a connection cable, a second vibration generator and a bracket of FIG. 2.

In an embodiment, a waterproof member 610 may be disposed at edges of the bracket 600 as illustrated in FIG. 4. The waterproof member 610 may be attached to an upper surface of the under-panel member 400 and the lower surface of the bracket 600. Therefore, the waterproof member 610 may effectively prevent penetration of moisture or dust into between the display panel 300 and the bracket 600. In such an embodiment, a waterproof and dustproof display device 10 may be provided.

In an embodiment, the waterproof member 610 may include a base film, a first adhesive layer disposed on a surface of the base film, and a second adhesive layer disposed on the other surface of the base film. The base film may be a PET film, a film including PET and a cushion layer, or a polyethylene foam ("PE-foam"). Each of the first adhesive layer and the second adhesive layer may be a PSA. The first adhesive layer may adhere to the lower surface of the under-panel member 400, and the second adhesive layer may adhere to an upper surface of the bracket 600.

The main circuit board 700 may be disposed under the bracket 600. The main circuit board 700 may be a printed circuit board or a flexible printed circuit board.

The main circuit board 700 may include a main processor 710, the camera device 720, a main connector 730, and a vibration driver 760. The vibration driver 760 may be disposed on an upper surface of the main circuit board 700 which faces the bracket 600. The main processor 710 and the main connector 730 may be disposed on a lower surface of the main circuit board 700 which faces the lower cover 900. In such an embodiment, the camera device 720 may be disposed on both the upper and lower surfaces of the main circuit board 700.

The main processor 710 may control the overall functions of the display device 10. In one embodiment, for example, the main processor 710 may output image data to the display driver 320 of the display circuit board 310 so that the display panel 300 displays an image. In such an embodiment, the main processor 710 may receive touch data from the touch driver 220, determine a user's touch position, and then execute an application indicated by an icon displayed at the user's touch position. In such an embodiment, the main processor 710 may receive touch data from the touch driver 220 and execute an application indicated by an icon displayed at the user's touch position according to the touch data.

In an embodiment, the main processor 710 may output sound data to the vibration driver 760 in a sound output mode.

The main processor 710 may be an application processor, a central processing unit, or a system chip, and the main processor 710 may be in a form of an integrated circuit.

The camera device 720 processes an image frame such as a still image or a moving image obtained by an image sensor in a camera mode and outputs the processed image frame to the main processor 710.

The connection cable 314 disposed through the through hole CAH of the bracket 600 may be connected to the main connector 730. Therefore, the main circuit board 700 may be electrically connected to the display circuit board 310, the touch circuit board 210, and the vibration circuit board 530.

The vibration driver 760 receives vibration data from the main processor 710. The vibration driver 760 generates a first driving voltage and a second driving voltage according to first vibration data and supplies the first driving voltage and the second driving voltage to the first vibration generator 510 through the vibration circuit board 530. Therefore, the first vibration generator 510 can output sound by vibrating the display panel 300.

In an embodiment, the vibration driver 760 generates a third driving voltage and a fourth driving voltage according to second vibration data and supplies the third driving voltage and the fourth driving voltage to the second vibration generator 520 through the vibration circuit board 530. Therefore, the second vibration generator 520 can output horizontal vibrations (X-Y-axis direction) of the display device 10 by vibrating the bracket 600.

The vibration driver 760 may include a digital signal processor ("DSP") for processing vibration data which is a digital signal, a digital-analog converter ("DAC") for converting the digital signal processed by the DSP into the first driving voltage and the second driving voltage or the third driving voltage and the fourth driving voltage which are analog signals, and an amplifier ("AMP") for amplifying the analog signals output from the DAC and outputting the amplified analog signals.

In an embodiment, the main circuit board 700 may further include a mobile communication module capable of transmitting or receiving a wireless signal to or from at least one of a base station, an external terminal, and a server over a mobile communication network. The wireless signal may include a voice signal, a video call signal, or various types of data according to text/multimedia message transmission/reception.

The lower cover 900 may be disposed under the bracket 600 and the main circuit board 700. The lower cover 900 may be fastened and fixed to the bracket 600. The lower cover 900 may defined a lower exterior surface of the display device 10. The lower cover 900 may include a plastic and/or a metal.

A second camera hole CMH2, into which the camera device 720 is inserted to protrude outward, may be defined or formed in the lower cover 900. The position of the camera device 720 and the positions of the first and second camera holes CMH1 and CMH2 corresponding to the camera device 720 are not limited to the embodiment illustrated in FIG. 2.

According to an embodiment, as illustrated in FIGS. 1 and 2, sound may be provided by vibrating the display panel 300 using the first vibration generator 510 disposed under the display panel 300, such that the first vibration generator 510 may function or be utilized as a front speaker.

In such an embodiment, horizontal vibrations may be provided by vibrating the bracket 600 using the second vibration generator 520. In such an embodiment, the vertical vibration of the first vibration generator 510 may cause noise of the display device 10. In one embodiment, for example, when the display device 10 is placed on the floor, the vertical vibration of the first vibration generator 510 may generate noise by vibrating not only the display panel 300 but also the floor. In an embodiment of the invention, the second vibration generator 520 vibrates in the horizontal direction, horizontal vibrations generated by the second vibration generator 520 may suppress generation of noise.

Figure 5:
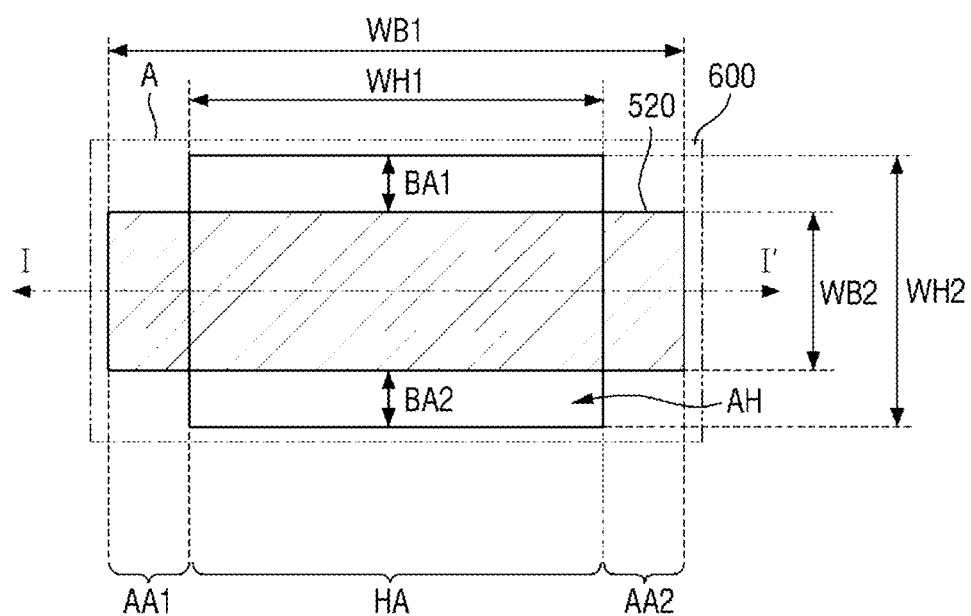
FIG. 5 is an enlarged view of an area A of FIG. 4.

FIG. 3 is a bottom view of an exemplary embodiment of the cover window 100, the touch circuit board 210, the display circuit board 310, the under-panel member 400, the first vibration generator 510 and the vibration circuit board 530 of FIG. 2. FIG. 4 is a bottom view of an exemplary embodiment of the connection cable 314, the second vibration generator 520 and the bracket 600 of FIG. 2. FIG. 5 is an enlarged view of an area A of FIG. 4.

A way by which the connection cable 314 connected to the display circuit board 310 is connected to the main connector 730 of the main circuit board 700 and a structure in which the second vibration generator 520 is attached to the bracket 600 will now be described in detail with reference to FIGS. 3 through 5.

Referring to FIGS. 3 and 5, in an embodiment, the vibration circuit board 530 may be connected to pad electrodes provided on at least one side portion of the first vibration generator 510. In such an embodiment, the vibration circuit board 530 may be connected to pad electrodes provided on at least one side portion of the second vibration generator 520. The vibration connection portion may be provided on a side portion of the vibration circuit board 530 and may be connected to the vibration connector 312b of the display circuit board 310.

The display circuit board 310 may include a circuit board 311 and the connection cable 314. The circuit board 311 may be attached to a side portion of the upper or lower surface of the substrate of the display panel 300 and may be bent toward the lower surface of the substrate of the display panel 300. In such an embodiment, the circuit board 311 may be fixed to fixing holes formed in the bracket 600 by fixing members.

The circuit board 311 may include the touch connector 312a, the vibration connector 312b, and a connection connector 312c. The touch connector 312a, the vibration connector 312b, and the connection connector 312c may be disposed on a surface of the circuit board 311.

The touch connector 312a may be connected to the touch connection portion provided at an end portion of the touch circuit board 210. Therefore, the touch driver 220 may be electrically connected to the display circuit board 310. The vibration connector 312b may be connected to the vibration connection portion provided at an end portion of the vibration circuit board 530. Therefore, the vibration driver 760 may be electrically connected to the display circuit board 310.

The connection connector 312c may be connected to an end portion of the connection cable 314 connected to the main connector 730 of the main circuit board 700. Therefore, the display circuit board 310 may be electrically connected to the main circuit board 700 by the connection cable 314.

A connector connection portion 315 may be disposed on another end portion of the connection cable 314. The connector connection portion 315 of the connection cable 314 may be disposed through the through hole CAH of the bracket 600 and extend to under the bracket 600 as illustrated in FIG. 4. The connector connection portion 315 of the connection cable 314 may be bent toward the lower surface of the main circuit board 700 and connected to the main connector 730 disposed on the lower surface of the main circuit board 700.

According to an embodiment, as illustrated in FIGS. 3 through 5, the vibration circuit board 530 connected to the first vibration generator 510 and the second vibration generator 520 may be connected to the display circuit board 312 by the vibration connector 312b, and the display circuit board 312 may be connected to the main connector 730 of the main circuit board 700 by the connection cable 314. Therefore, the first vibration generator 510 and the second vibration generator 520 may be electrically connected to the vibration driver 760 of the main circuit board 700.

The attachment structure of the second vibration generator 520 will now be described in detail with reference to FIG. 5.

The second vibration generator 520 may be attached to the bottom surface of the bracket 600 as described above and may include a first attachment area AA1 and a second attachment area AA2 attached to the bottom surface of the bracket 600. In such an embodiment, the second vibration generator 520 may include a hole area HA disposed between the first attachment area AA1 and the second attachment area AA2 to overlap the accommodating hole AH.

The first attachment area AA1 and the second attachment area AA2 may be areas of the second vibration generator 520 which are attached to the bracket 600 by a fifth adhesive member 950 to be described later. The first attachment area AA1 may be located at an end portion of the second vibration generator 520, and the second attachment area AA2 may be located at another end portion (or an opposing end portion) of the second vibration generator 520. The first attachment area AA1 and the second attachment area AA2 may have substantially a same width as each other, or may have different widths from each other.

The hole area HA may be an area between the first attachment area AA1 and the second attachment area AA2. In the hole area HA, the second vibration generator 520 may not be attached to the bracket 600 and may not contact other elements. A width of the hole area HA may be greater than the width of the first attachment area AA1 and the width of the second attachment area AA2. However, embodiments are not limited to this case, and alternatively, the width of the hole area HA may also be smaller than the width of the first attachment area AA1 and the width of the second attachment area AA2.

The first attachment area AA1, the second attachment area AA2, and the hole area HA may be defined in the second vibration generator 520 as described above. The first attachment area AA1 and the second attachment area AA2 may be areas of the second vibration generator 520 which overlap the bracket 600, and the hole area HA may be an area of the second vibration generator 520 which does not overlap the bracket 600. In the second vibration generator 520, the first attachment area AA1, the hole area HA, and the second attachment area AA2 may be sequentially arranged along a length direction thereof.

In an embodiment, as shown in FIG. 5, a width WH1 of the accommodating hole AH in the first direction X may be smaller than a width WB1 of the second vibration generator 520 in the first direction X. In such an embodiment, a width WH2 of the accommodating hole AH in the second direction Y may be greater than a width WB2 of the second vibration generator 520 in the second direction Y. In such an embodiment, the width WB1 of the second vibration generator 520 may be greater in the first direction X, and the width WH2 of the accommodating hole AH may be greater in the second direction Y.

The sum of the width of the first attachment area AA1 and the width of the second attachment area AA2 may be equal to a difference between the width WB1 of the second vibration generator 520 in the first direction X and the width WH1 of the accommodating hole AH in the first direction X. In such an embodiment, the width of the hole area HA between the first attachment area AA1 and the second attachment area AA2 may be equal to the width WH1 of the accommodating hole AH in the first direction X.

The accommodating hole AH may include the hole area HA overlapping the second vibration generator 520 and non-overlap areas BA1 and BA2 not overlapping the second vibration generator 520. The accommodating hole AH may include at least one of a first non-overlap area BA1 and a second non-overlap area BA2. The first non-overlap area BA1 may be located on a side portion of the second vibration generator 520 in the second direction Y, and the second non-overlap area BA2 may be located on another side portion of the second vibration generator 520 in the second direction Y. However, in an alternative embodiment, the width WB2 of the second vibration generator 520 in the second direction Y is equal to the width WH2 of the accommodating hole AH in the second direction Y, such that the accommodating hole AH may not include the non-overlap areas BA1 and BA2.

FIG. 6 is a cross-sectional view taken along line I-I' of FIGS. 3 and 4. Although the vibration circuit board 530 is not illustrated for ease of description, each of the first vibration generator 510 and the second vibration generator 520 may be electrically connected to the vibration circuit board 530 by pad electrodes disposed at an upper or lower end portion of the vibration generator 510 or 520.

Since the cover window 100, the touch sensing device 200, the display panel 300, the under-panel member 400, the first adhesive member 910, the second adhesive member 920 and the third adhesive member 930 illustrated in FIG. 6 have been described in detail with reference to FIGS. 1 and 2, any repetitive detailed description thereof will be omitted for convenience of description.

Referring to FIG. 6, the first vibration generator 510 is disposed under the under-panel member 400. The first vibration generator 510 may be attached to the lower surface of the under-panel member 400 by the fourth adhesive member 940. The fourth adhesive member 940 may be a PSA.

The first vibration generator 510 may be disposed in the accommodating hole AH defined through the bracket 600. In an embodiment, where the height of the first vibration generator 510 is not great, an accommodating groove may be defined or formed in the bracket 600 instead of the accommodating hole AH.

The second vibration generator 520 may be attached to the lower surface of the bracket 600 by the fifth adhesive member 950. The fifth adhesive member 950 may be a PSA. The second vibration generator 520 may be attached to the lower surface of the bracket 600 to overlap the accommodating hole AH. As illustrated in FIG. 6, only a part of an upper surface 520a of the second vibration generator 520 may be attached to a lower surface 600b of the bracket 600, which is opposite to an upper surface 600a. In such an embodiment, a side portion and another side portion of the upper surface 520a of the second vibration generator 520 may be attached to the lower surface 600b of the bracket 600, and a central part of the second vibration generator 520 may not be attached to the lower surface 600b of the bracket 600.

Since the second vibration generator 520 is attached to the lower surface 600b of the bracket 600, a lower surface 520b of the second vibration generator 520 may be located below the lower surface 600b of the bracket 600. In an embodiment, where a groove to which the second vibration generator 520 is attached is formed in the bracket 600, the lower surface 520b of the second vibration generator 520 may be located above the lower surface 600b of the bracket 600.

In an embodiment, as described above with reference to FIG. 5, areas of the second vibration generator 520 which are attached to the bracket 600 may be the first attachment area AA1 and the second attachment area AA2, and the hole area HA between the first attachment area AA1 and the second attachment area AA2 may be an area of the second vibration generator 520 which is not attached to the bracket 600.

In the first attachment area AA1 and the second attachment area AA2, the second vibration generator 520 may be attached to the bracket 600 by the fifth adhesive member 950.

In the hole area HA, at least a part of the second vibration generator 520 may directly face the first vibration generator 510. In an embodiment, a width WA1 of the first vibration generator 510 in the first direction X may be smaller than the width WB1 of the second vibration generator 520 in the first direction X. In such an embodiment, the width WA1 of the first vibration generator 510 in the first direction X may be smaller than the width WH1 of the accommodating hole AH in the first direction X. However, embodiments are not limited to this case, and alternatively, the width WA1 of the first vibration generator 510 in the first direction X may also be greater than the width WB1 of the second vibration generator 520 in the first direction X.

A thickness H2 of the second vibration generator 520 may be substantially equal to a thickness H1 of the first vibration generator 510, or may be different from the thickness H1 of the first vibration generator 510. In an embodiment, a thickness H1 of the first vibration generator 510 and the thickness H2 of the second vibration generator 520 may be smaller than a thickness of the bracket 600.

The first vibration generator 510 will now be described in detail with reference to FIGS. 7 through 12.

Figure 7:
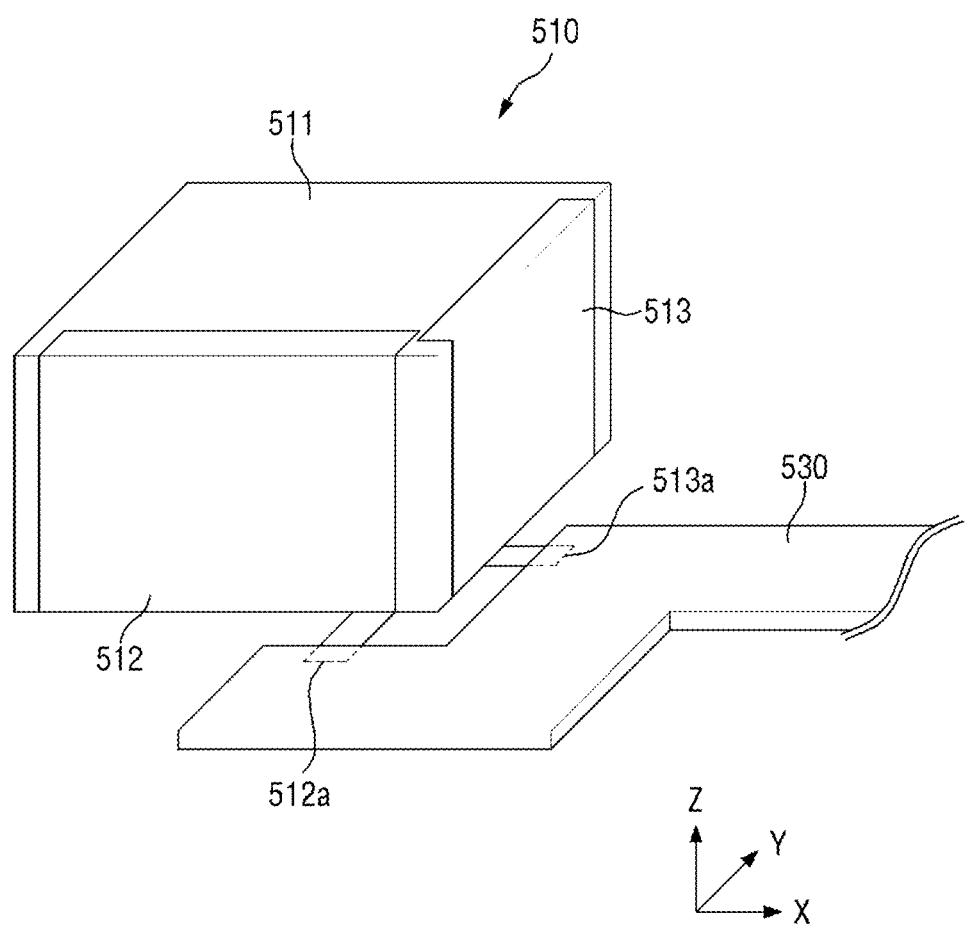
FIG. 7 is a perspective view of an exemplary embodiment of the first vibration generator of FIG. 3.
Figure 8:
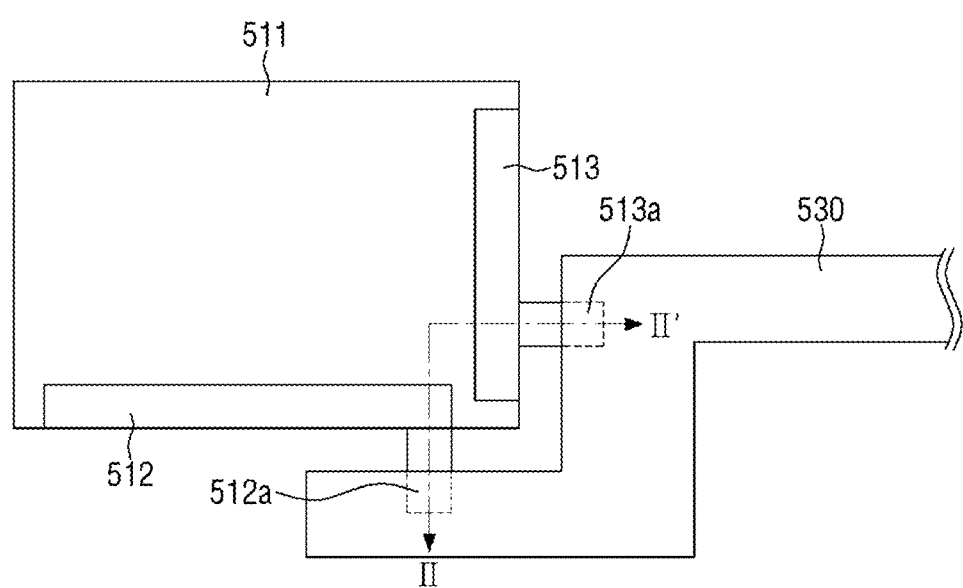
FIG. 8 is a plan view of an exemplary embodiment of the first vibration generator of FIG. 3.
Figure 9:
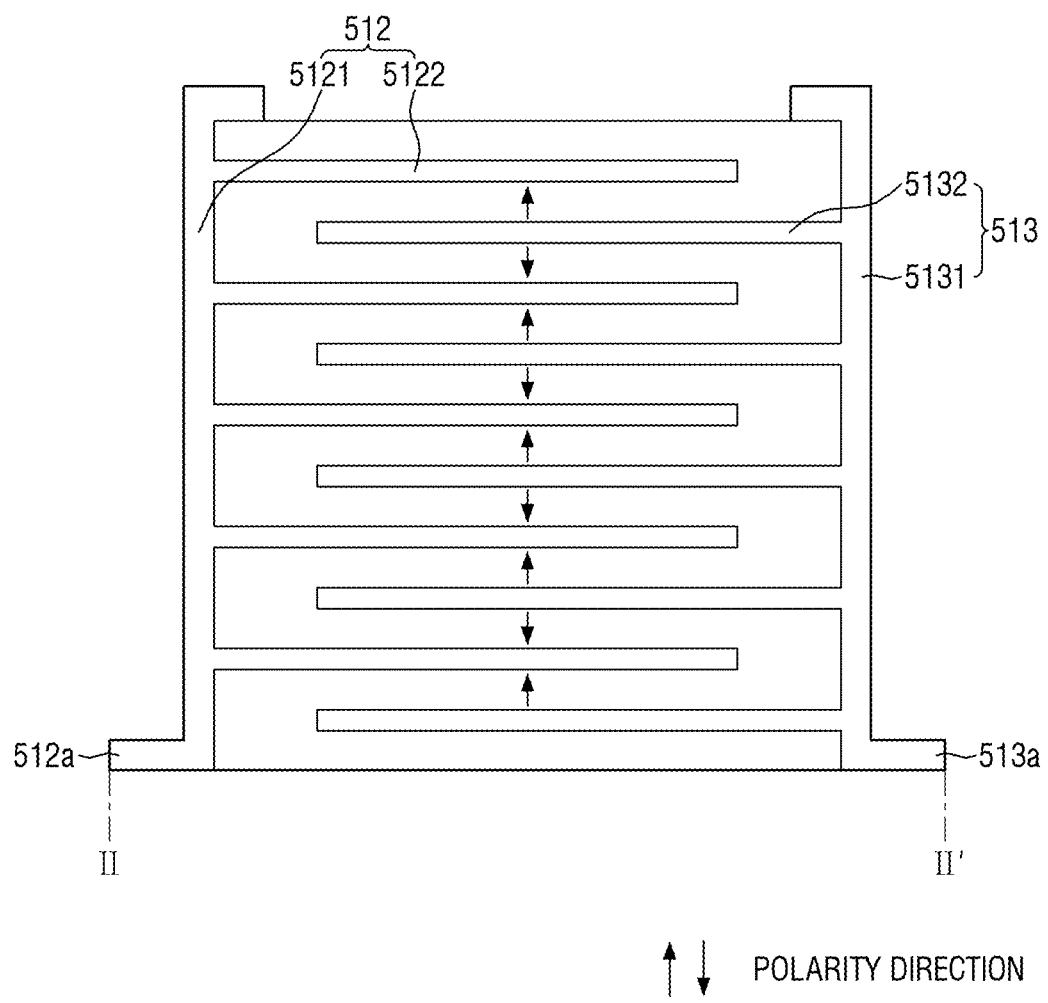
FIG. 9 is a cross-sectional view taken along line II-II' of FIG. 8.
Figure 10:
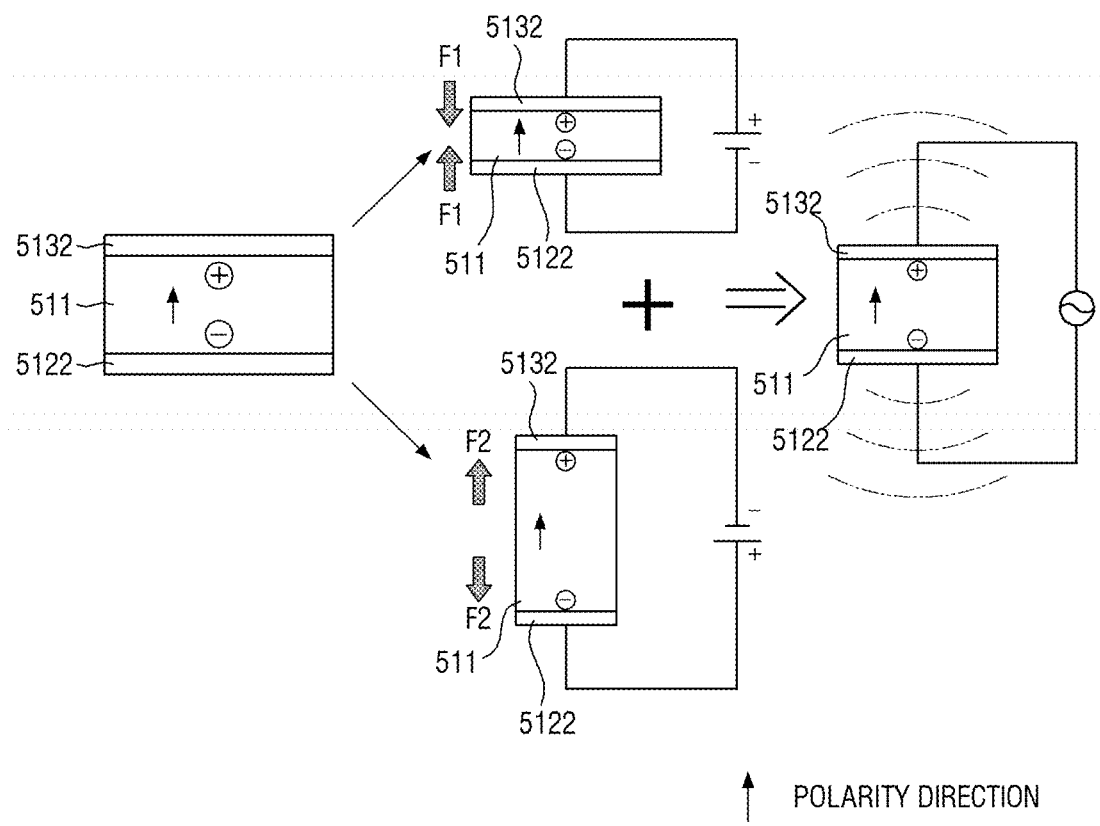
FIG. 10 illustrates a method of vibrating a vibration layer disposed between a first branch electrode and a second branch electrode of the first vibration generator.

FIG. 7 is a perspective view of an exemplary embodiment of the first vibration generator 510 of FIG. 3. FIG. 8 is a plan view of an exemplary embodiment of the first vibration generator 510 of FIG. 3. FIG. 9 is a cross-sectional view taken along line II-II' of FIG. 8. FIG. 10 illustrates a method of vibrating a vibration layer 511 disposed between a first branch electrode 5122 and a second branch electrode 5132 of the first vibration generator 510. FIGS. 11 and 12 illustrate a method of vibrating the display panel 300 in the Z-axis direction through the vibration of the first vibration generator 510.

The structure of the first vibration generator 510 will now be described in detail with reference to FIGS. 7, 8 and 9.

Referring to FIGS. 7, 8 and 9, the first vibration generator 510 may include the vibration layer 511, a first electrode 512, a second electrode 513, a $(1A)^{th}$ pad electrode 512a, and a $(2A)^{th}$ pad electrode 513a.

In an embodiment, as shown in FIG. 9, the first electrode 512 may include a first stem electrode 5121 and first branch electrodes 5122. The first stem electrode 5121 may be disposed on one side surface of the vibration layer 511. The first stem electrode 5121 may also be disposed on a plurality of side surfaces of the vibration layer 511. The first stem electrode 5121 may be disposed on an upper surface of the vibration layer 511. The first branch electrodes 5122 may branch from the first stem electrode 5121. The first branch electrodes 5122 may be arranged parallel to each other.

In such an embodiment, the second electrode 513 may include a second stem electrode 5131 and second branch electrodes 5132. The second stem electrode 5131 may be disposed on another side surface of the vibration layer 511. The second stem electrode 5131 may also be disposed on a plurality of side surfaces of the vibration layer 511 on which the first stem electrode 5121 is not disposed. The second stem electrode 5131 may be disposed on the upper surface of the vibration layer 511. The first stem electrode 5121 and the second stem electrode 5131 may not overlap each other. The second branch electrodes 5132 may branch from the second stem electrode 5131. The second branch electrodes 5132 may be arranged parallel to each other.

The first branch electrodes 5122 and the second branch electrodes 5132 may be arranged parallel to each other in the horizontal direction (X-axis direction or Y-axis direction). In addition, the first branch electrodes 5122 and the second branch electrodes 5132 may be alternately arranged in the vertical direction (Z-axis direction). That is, the first branch electrodes 5122 and the second branch electrodes 5132 may be repeatedly and alternately arranged in the vertical direction (Z-axis direction) in the order of the first branch electrode 5122, the second branch electrode 5132, the first branch electrode 5122, and the second branch electrode 5132.

The $(1A)^{th}$ pad electrode 512a may be connected to the first electrode 512. The $(1A)^{th}$ pad electrode 512a may protrude outward from the first stem electrode 5121 disposed on a side surface of the vibration layer 511.

The $(2A)^{th}$ pad electrode 513a may be connected to the second electrode 513. The $(2A)^{th}$ pad electrode 513a may protrude outward from the second stem electrode 5131 disposed on another side surface of the vibration layer 511.

The $(1A)^{th}$ pad electrode 512a and the $(2A)^{th}$ pad electrode 513a may be connected to metal lines or pad electrodes of the vibration circuit board 530. The metal lines or pad electrodes of the vibration circuit board 530 may be disposed on a lower surface of the first vibration circuit board 530.

In an embodiment, where the $(1A)^{th}$ pad electrode 512a and the $(2A)^{th}$ pad electrode 513a protrude outward from different side surfaces of the vibration layer 511 as illustrated in FIG. 7, the vibration circuit board 530 may be disposed on the side surfaces of the first vibration generator 510. However, embodiments are not limited to this case. Alternatively, the $(1A)^{th}$ pad electrode 512a and the $(2A)^{th}$ pad electrode 513a may protrude outward from one side surface, and the vibration circuit board 530 may be disposed on the side surface of the first vibration generator 510.

Since the production temperature of the vibration layer 511 is high, the first electrode 512 and the second electrode 513 may include or be made of silver (Ag) having a high melting point or an alloy of Ag and palladium (Pd). In an embodiment, where the first electrode 512 and the second electrode 513 include or are made of an alloy of Ag and Pd, the content of Ag may be higher than that of Pd.

The vibration layer 511 may be a piezo actuator that is deformed according to the first driving voltage applied to the first electrode 512 and the second driving voltage applied to the second electrode 513. In an embodiment, the vibration layer 511 may include at least one of a piezoelectric material, such as a polyvinylidene fluoride ("PVDF") film or plumbum ziconate titanate ("PZT"), and an electroactive polymer.

The vibration layer 511 may be disposed between each pair of the first and second branch electrodes 5122 and 5132. The vibration layer 511 contracts or expands according to a potential difference between the first driving voltage applied to each first branch electrode 5122 and the second driving voltage applied to a corresponding second branch electrode 5132.

A method of vibrating the vibration layer 511 of the first vibration generator 510 will now be described in detail with reference to FIGS. 9, 10, 11 and 12.

Specifically, referring to FIG. 9, the polarity direction of the vibration layer 511 disposed between a first branch electrode 5122 and a second branch electrode 5132 disposed under the first branch electrode 5122 may be an upward direction (↑). In this case, the vibration layer 511 has a positive polarity in an upper area adjacent to the first branch electrode 5122 and a negative polarity in a lower area adjacent to the second branch electrode 5132. In addition, the polarity direction of the vibration layer 511 disposed between a second branch electrode 5132 and a first branch electrode 5122 disposed under the second branch electrode 5132 may be a downward direction (↓). In this case, the vibration layer 511 has a negative polarity in an upper area adjacent to the second branch electrode 5132 and a positive polarity in a lower area adjacent to the first branch electrode 5122. The polarity direction of the vibration layer 511 may be determined by a poling process of an electric field applied to the vibration layer 511 using a first branch electrode 5122 and a second branch electrode 5132.

When the polarity direction of the vibration layer 511 disposed between a first branch electrode 5122 and a second branch electrode 5132 disposed under the first branch electrode 5122 is the upward direction (↑) as illustrated in FIG. 10, if the first driving voltage of the positive polarity is applied to the first branch electrode 5122 and the second driving voltage of the negative polarity is applied to the second branch electrode 5132, the vibration layer 511 may contract according to a first force F1. The first force F1 may be a compressive force. Also, if the first driving voltage of the negative polarity is applied to the first branch electrode 5122 and the second driving voltage of the positive polarity is applied to the second branch electrode 5132, the vibration layer 511 may expand according to a second force F2. The second force F2 may be a tensile force.

In addition, when the polarity direction of the vibration layer 511 disposed between a second branch electrode 5132 and a first branch electrode 5122 disposed under the second branch electrode 5132 is the downward direction (↓), if the first driving voltage of the positive polarity is applied to the second branch electrode 5132 and the second driving voltage of the negative polarity is applied to the first branch electrode 5122, the vibration layer 511 may expand according to a tensile force. Also, if the first driving voltage of the negative polarity is applied to the second branch electrode 5132 and the second driving voltage of the positive polarity is applied to the first branch electrode 5122, the vibration layer 511 may contract according to a compressive force. The second force F2 may be a tensile force.

According to an embodiment, as illustrated in FIG. 9, when the first driving voltage applied to the first electrode 512 and the second driving voltage applied to the second electrode 513 repeatedly alternate between the positive polarity and the negative polarity, the vibration layer 511 may repeatedly contact and expand, thus causing the first vibration generator 510 to vibrate.

In such an embodiment, since the first vibration generator 510 is disposed on the lower surface of the display panel 300, when the vibration layer 511 of the first vibration generator 510 contracts and expands, the display panel 300 may vibrate upwardly and downwardly due to stress, as illustrated in FIGS. 11 and 12. In such an embodiment, since the display panel 300 is vibrated by the first vibration generator 510, the display device 10 may output sound.

The structure and vibration method of the second vibration generator 520 may be substantially the same as those of the first vibration generator 510 described above with reference to FIGS. 7 through 12, and thus any repetitive detailed description thereof will be omitted. Hereinafter, a method of vibrating the bracket 600 in the horizontal direction using the second vibration generator 520 will be described with reference to FIGS. 13 through 15.

Figure 13:
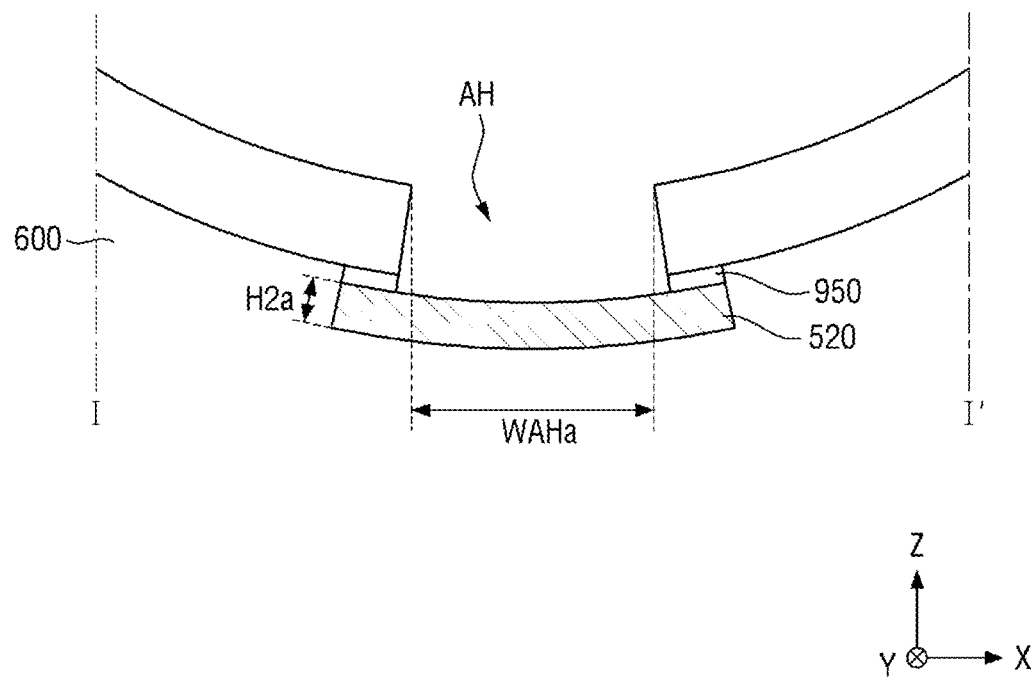
FIGS. 13 through 15 illustrate a method of vibrating the display panel in a horizontal direction through the vibration of the second vibration generator.
Figure 14:
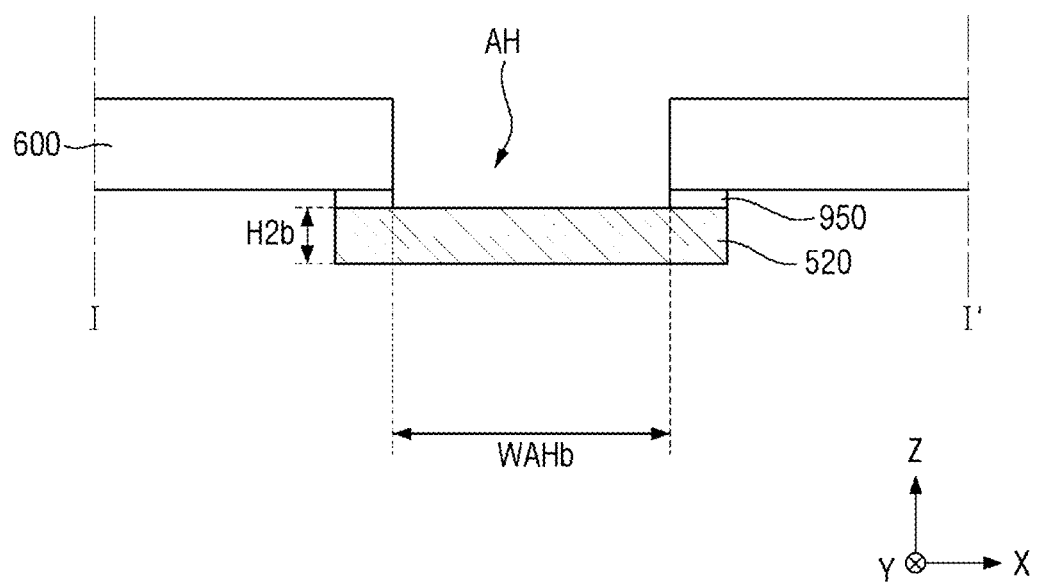
Figure 15:
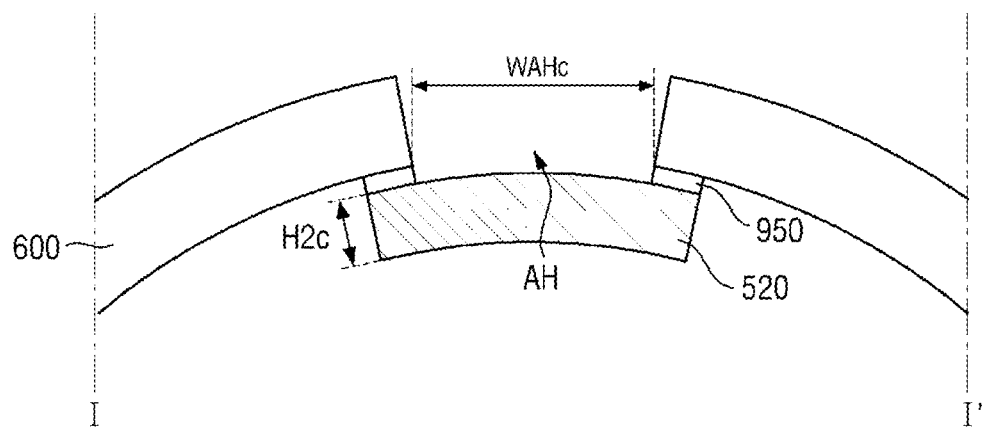

FIGS. 13 through 15 illustrate a method of vibrating the display panel 300 in the horizontal direction through the vibration of the second vibration generator 520. For ease of description, only the bracket 600 and the second vibration generator 520 attached to the bottom surface of the bracket 600 are illustrated. However, other elements may be further disposed on or under the bracket 600 and the second vibration generator 520 as illustrated in FIG. 6.

FIGS. 13 through 15 illustrate a case where the second vibration generator 520 sequentially contacts, relaxes, and expands. The second vibration generator 520 may relax again after expanding. As described above with respect to the first vibration generator 510, the second vibration generator 520 may vibrate by repeating contraction and expansion. Specifically, the second vibration generator 520 may repeat contraction, relaxation, expansion and relaxation sequentially in this order.

Referring to FIGS. 13 through 15, the second vibration generator 520 may be attached to the bottom surface of the bracket 600, and at least a part of the second vibration generator 520 may overlap the accommodating hole AH of the bracket 600. That is, the second vibration generator 520 may be disposed to cross the accommodating hole AH in a plan view and may have opposing end portions attached to the bracket 600.

When the second vibration generator 520 contracts as illustrated in FIG. 13, an entire portion of the second vibration generator 520 may be bent in the downward direction (−Z-axis direction). A compressive force may act on the bracket 600 to which the second vibration generator 520 is attached according to a compressive force acting on the second vibration generator 520. That is, the bracket 600 attached to both opposing side portions of the second vibration generator 520 may move inward. Accordingly, a first gap WAHa may be formed between a part of the bracket 600 which is attached to a first side portion of the second vibration generator 520 and a part of the bracket 600 which is attached to a second side portion of the second vibration generator 520. The first gap WAHa may be smaller than a gap WAHb (see FIG. 14) between the parts of the bracket 600 when the second vibration generator 520 does not contract. A thickness H2a of the second vibration generator 520 when the second vibration generator 520 contracts may be smaller than a thickness H2b (see FIG. 14) of the second vibration generator 520 when the second vibration generator 520 does not contract.

After the second vibration generator 520 contracts as illustrated in FIG. 13, the second vibration generator 520 may relax as illustrated in FIG. 14. When the second vibration generator 520 relaxes, the compressive force may no longer act on the parts of the bracket 600 which are attached to the second vibration generator 520. Accordingly, the part of the bracket 600 which is attached to the first side portion of the second vibration generator 520 and the part of the bracket 600 which is attached to the second side portion of the second vibration generator 520. The second gap WAHb may be greater than the first gap WAHa described above in FIG. 13.

When the second vibration generator 520 expands as illustrated in FIG. 15, the entire portion of the second vibration generator 520 may be bent in the upward direction (+Z-axis direction). A tensile force may act on the bracket 600 to which the second vibration generator 520 is attached according to a tensile force acting on the second vibration generator 520. Accordingly, a third gap WAHc may be formed between the part of the bracket 600 which is attached to the first side portion of the second vibration generator 520 and the part of the bracket 600 which is attached to the second side portion of the second vibration generator 520. The third gap WAHc may be smaller than the gap WAHb (see FIG. 14) between the parts of the bracket 600 when the second vibration generator 520 does not expand. A thickness H2c of the second vibration generator 520 when the second vibration generator 520 expands may be greater than the thickness H2b (see FIG. 14) of the second vibration generator 520 when the second vibration generator 520 does not expand.

In such an embodiment, as described above, the second vibration generator 520 may be bent upward or downward according to an applied voltage, and a force may act on parts of the bracket 600 which are attached to the second vibration generator 520 according to the contraction or expansion of the second vibration generator 520. When the second vibration generator 520 contracts or expands, a gap between the parts of the bracket 600 which are attached to the second vibration generator 520 may decrease. When the second vibration generator 520 relaxes between contraction and expansion, the gap between the parts of the bracket 600 which are attached to the second vibration generator 520 may increase. In such an embodiment, the width of the accommodating hole AH formed in the bracket 600 may continuously change according to the contraction and expansion of the second vibration generator 520.

Therefore, when the second vibration generator 520 generates vibrations in the vertical direction (e.g., the Z-axis direction) through contraction and expansion, the bracket 600 to which the second vibration generator 520 is attached may generate vibrations in the horizontal direction (e.g., the X-axis direction or the Y-axis direction).

Hereinafter, alternative embodiments of the display device will be described. Hereinafter, the same or like elements as those of the above-described embodiments will be indicated by the same reference numerals, and any repetitive detailed description thereof will be omitted or simplified. The following embodiments will be described, focusing mainly on differences.

FIGS. 16 through 31 are enlarged views and cross-sectional views of the area A of FIG. 4 according to alternative embodiments.

Figure 16:
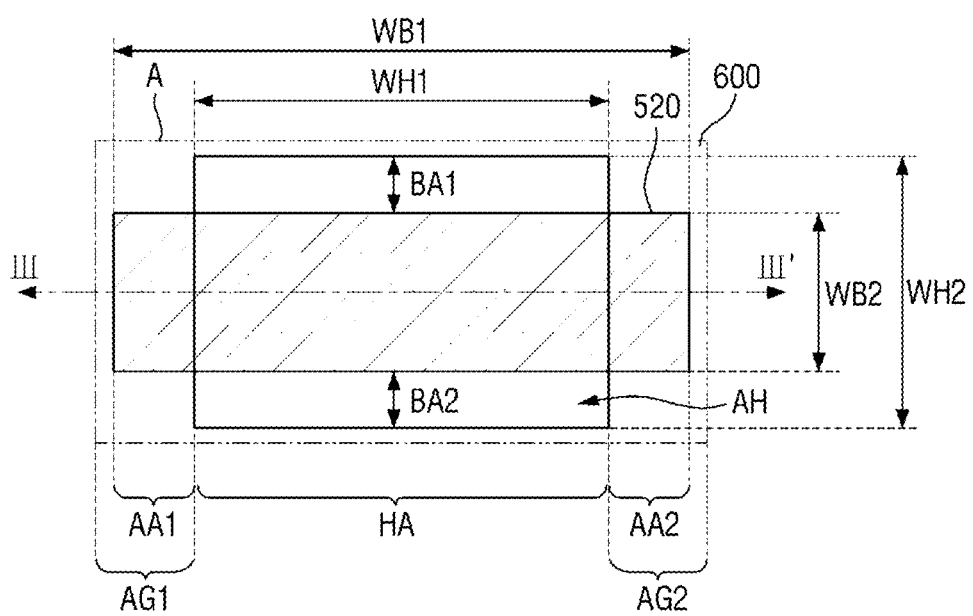
FIGS. 16 through 31 are enlarged views and cross-sectional views of the area A of FIG. 4 according to alternative embodiments.
Figure 17:
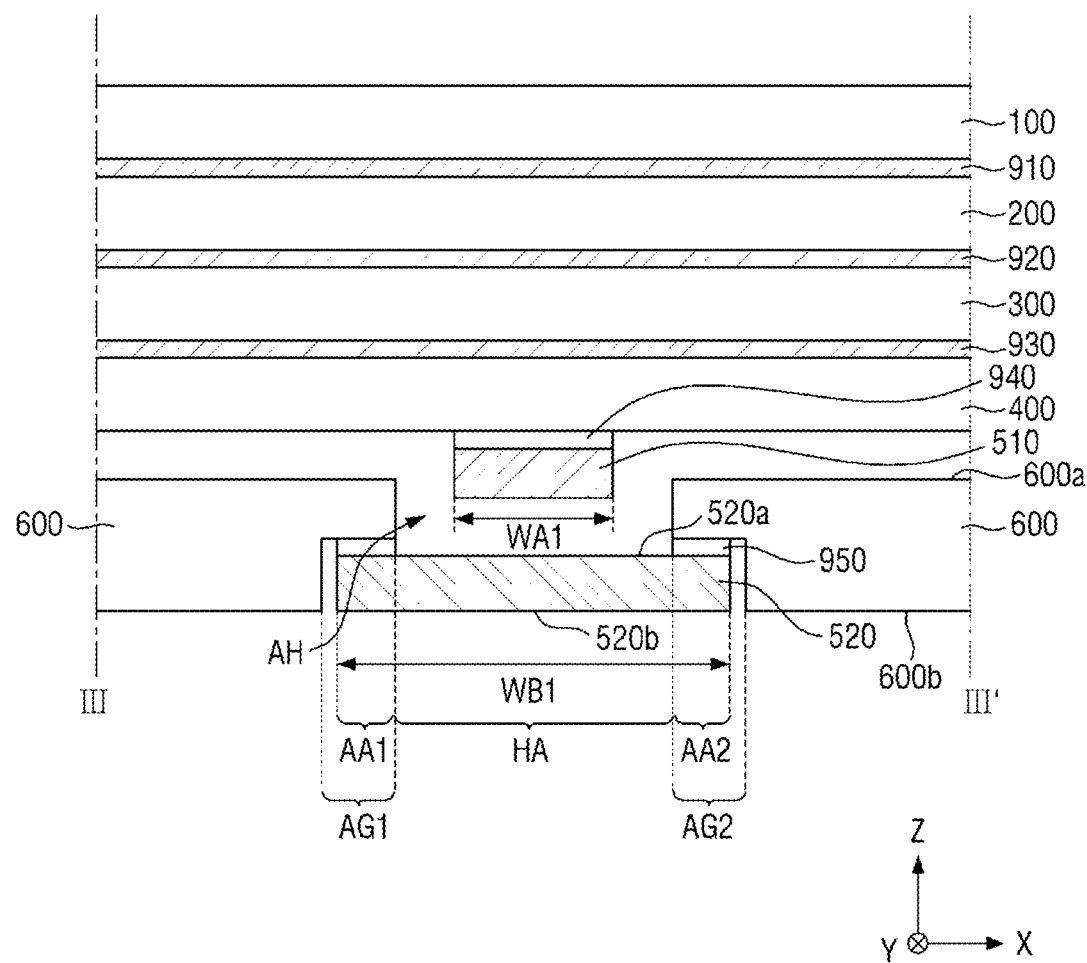

Referring to FIGS. 16 and 17, in an alternative embodiment, a bracket 600 may include groove areas AG1 and AG2 to which a second vibration generator 520 is attached. The groove areas AG1 and AG2 may be formed by recessing parts of a lower surface 600b of the bracket 600, which are adjacent to an accommodating hole AH, in a thickness direction (Z-axis direction). A thickness of the bracket 600 in the groove areas AG1 and AG2 may be smaller than that of the bracket 600 in other areas.

A first groove area AG1 may include a first attachment area AA1, and an end portion of the second vibration generator 520 may be attached to the first groove area AG1 by a fifth adhesive member 950. The second groove area AG2 may include a second attachment area AA2, and another end portion of the second vibration generator 520 may be attached to the second groove area AG2 by the fifth adhesive member 950.

The groove areas AG1 and AG2 may be wider than the attachment areas AA1 and AA2 to provide spaces allow the second vibration generator 520 to vibrate therein. That is, a width of the first groove area AG1 may be greater than that of the first attachment area AA1. In an embodiment, a width of the second groove area AG2 may be greater than that of the second attachment area AA2.

The second vibration generator 520 may be attached to the bracket 600 through the first groove area AG1 and the second groove area AG2 such that the second vibration generator 520 is close to a first vibration generator 510. In such an embodiment, a lower surface 520b of the second vibration generator 520 may be located above the lower surface 600b of the bracket 600 or may be located in the same plane with the lower surface 600b of the bracket 600. That is, since the second vibration generator 520 is disposed inside the bracket 600, the second vibration generator 520 may be provided without increasing the overall thickness of a display device. In such an embodiment, since the thickness of areas to which the second vibration generator 520 is attached is reduced, the second vibration generator 520 may effectively transmit vibrations to the bracket 600.

The embodiment of FIGS. 16 and 17 may be applied to embodiments to be described below. That is, the second vibration generator 520 may be disposed without increasing the thickness of the display device, and vibration efficiency may be improved.

Figure 18:
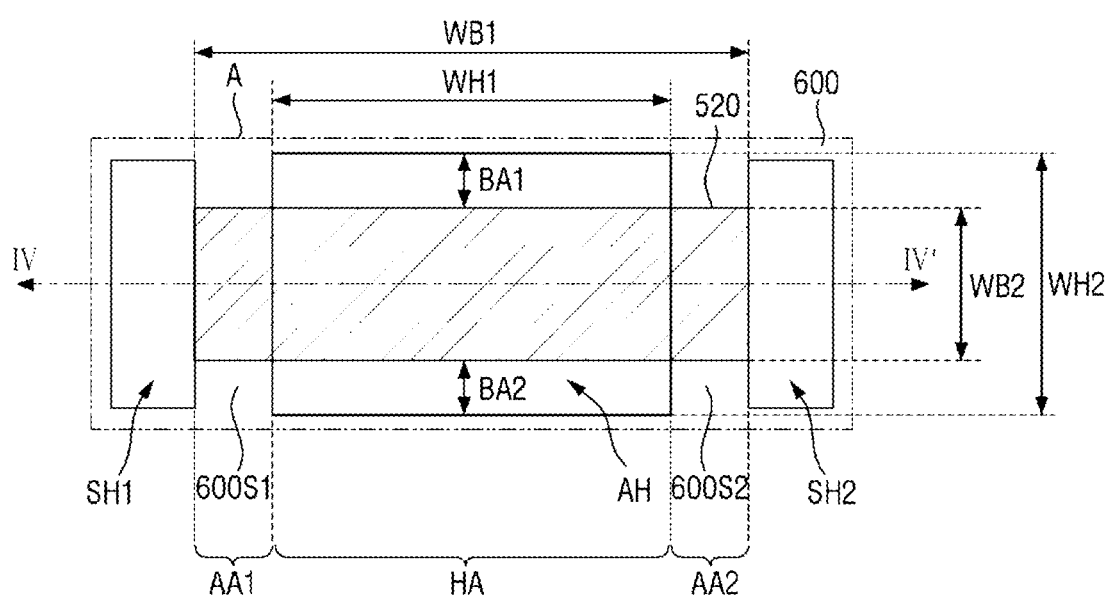
Figure 19:
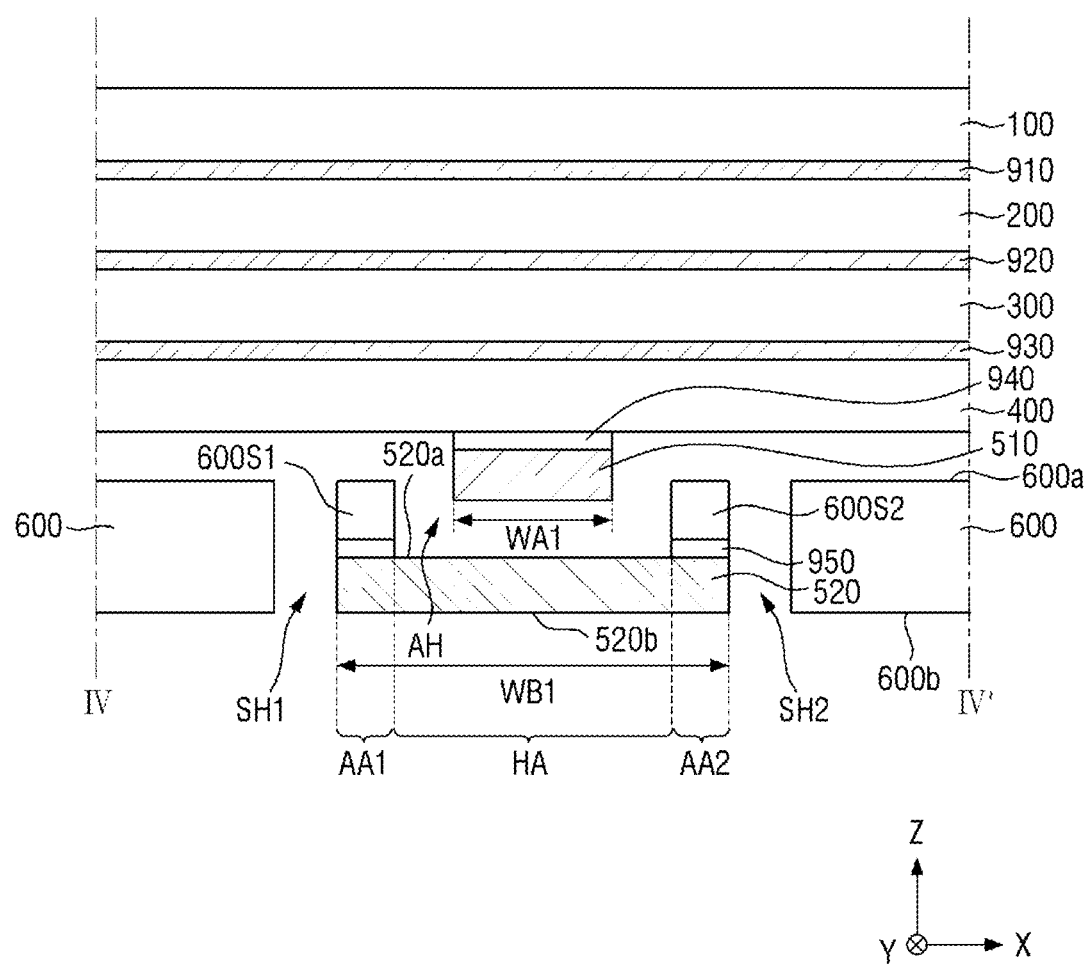

Referring to FIGS. 18 and 19, in another alternative embodiment, sub-accommodating holes SH1 and SH2 are defined through a bracket 600 to be adjacent to an accommodating hole AH in the first direction (X-axis direction). In an embodiment, a first sub-accommodating hole SH1 may be defined or formed on a left side portion of the accommodating hole AH in the drawings, and a second sub-accommodating hole SH2 may be defined or formed on a right side portion of the accommodating hole AH.

A first attachment portion 600S1 may be located between the first sub-accommodating hole SH1 and the accommodating hole AH. The first attachment portion 600S1 may be a part of the bracket 600 to which a second vibration generator 520 is attached. In one embodiment, for example, a first attachment area AA1 may be formed in the first attachment portion 600S1, and an end portion of the second vibration generator 520 may be attached to the first attachment area AA1.

A second attachment portion 600S2 may be located between the second sub-accommodating hole SH2 and the accommodating hole AH. Like the first attachment portion 600S1, the second attachment portion 600S2 may be a part of the bracket 600 to which the second vibration generator 520 is attached. In one embodiment, for example, a second attachment area AA2 may be formed in the second attachment portion 600S2, and another end portion of the second vibration generator 520 may be attached to the second attachment area AA2.

Like the groove areas AG1 and AG2 described in FIGS. 16 and 17, the first attachment portion 600S1 and the second attachment portion 600S may be thinner than other areas of the bracket 600. In such an embodiment, since the second vibration generator 520 is located inside the bracket 600 in the thickness direction, the second vibration generator 520 may be attached to the bracket 600 without increasing the thickness of a display device.

In such an embodiment, the second vibration generator 520 is attached only to the first attachment portion 600S1 and the second attachment portion 600S2 as illustrated in FIGS. 18 and 19. Therefore, vibrations may be transmitted to these areas in a concentrated manner. That is, the first attachment portion 600S1 and the second attachment portion 600S2 may vibrate more effectively in the horizontal direction (X-axis direction or Y-axis direction). Since the horizontal vibrations generated by the first attachment portion 600S1 and the second attachment portion 600S2 are transmitted to the whole of the bracket 600, the vibration efficiency of the display device may be improved.

Figure 20:
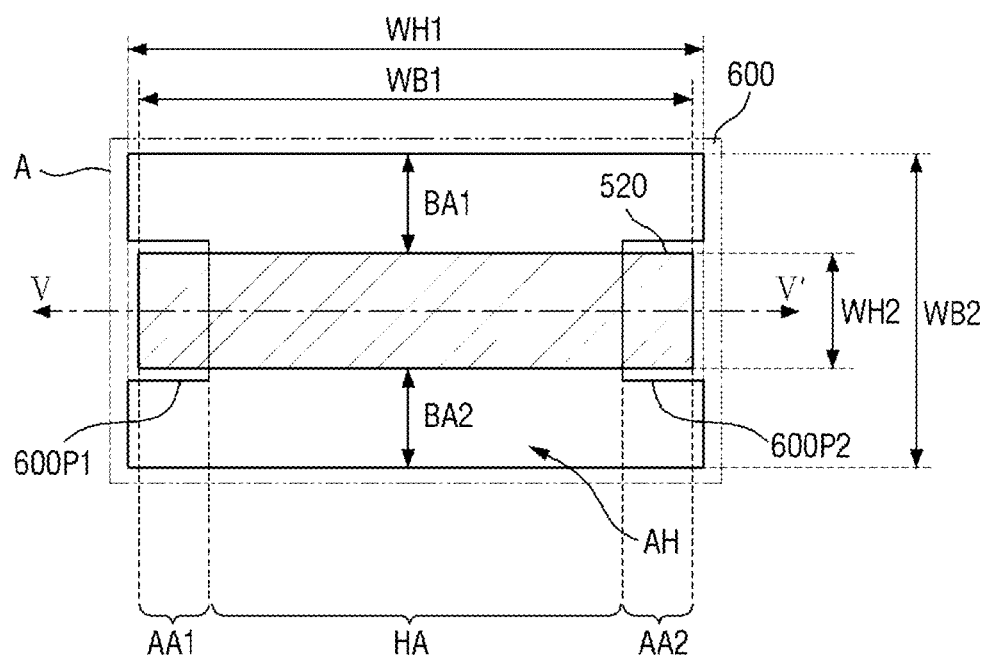
Figure 21:
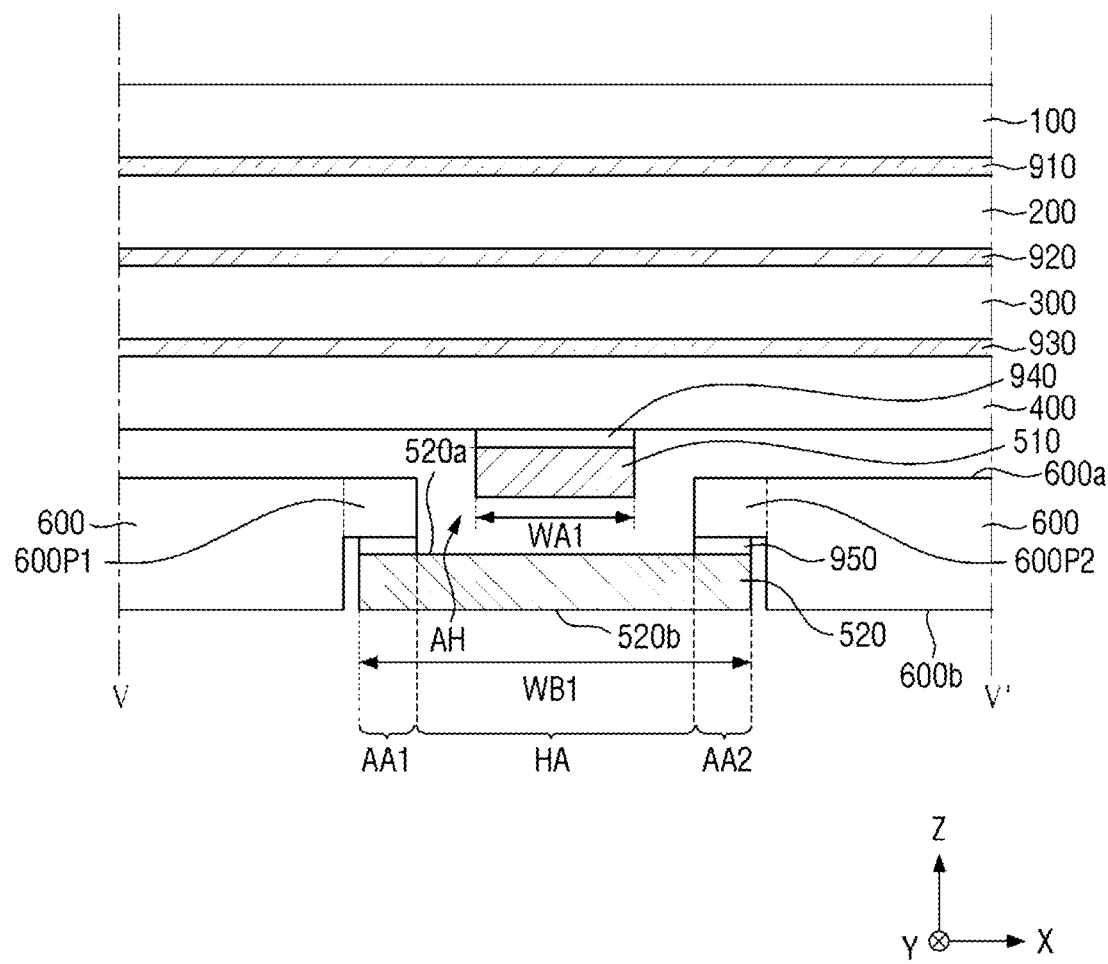

Referring to FIGS. 20 and 21, in another alternative embodiment, a bracket 600 may include protrusions 600P1 and 600P2 that define an accommodating hole AH.

A first protrusion 600P1 and a second protrusion 600P2 may extend to the accommodating hole AH to provide spaces to which a second vibration generator 520 is to be attached. An end portion of the second vibration generator 520 may be attached to the first protrusion 600P1, and another end portion of the second vibration generator 520 may be attached to the second protrusion 600P2.

The first protrusion 600P1 and the second protrusion 600P2 may face each other in the first direction (X-axis direction). The first protrusion 600P1 and the second protrusion 600P2 may be thinner than other areas of the bracket 600. In such an embodiment, the second vibration generator 520 may be disposed without increasing the thickness of a display device.

When the second vibration generator 520 is attached to the first protrusion 600P1 and the second protrusion 600P2, vibrations generated by the second vibration generator 520 may be transmitted to these areas in a concentrated manner. In such an embodiment, since vibrations generated by the second vibration generator 520 can be effectively transmitted to the bracket 600, the bracket 600 may output improved horizontal vibrations.

Figure 22:
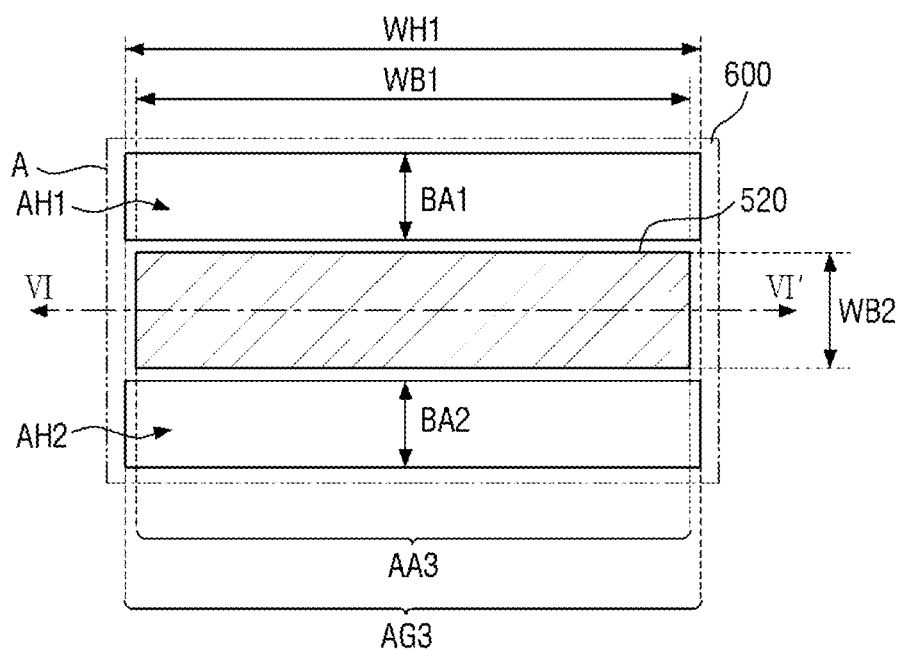
Figure 23:
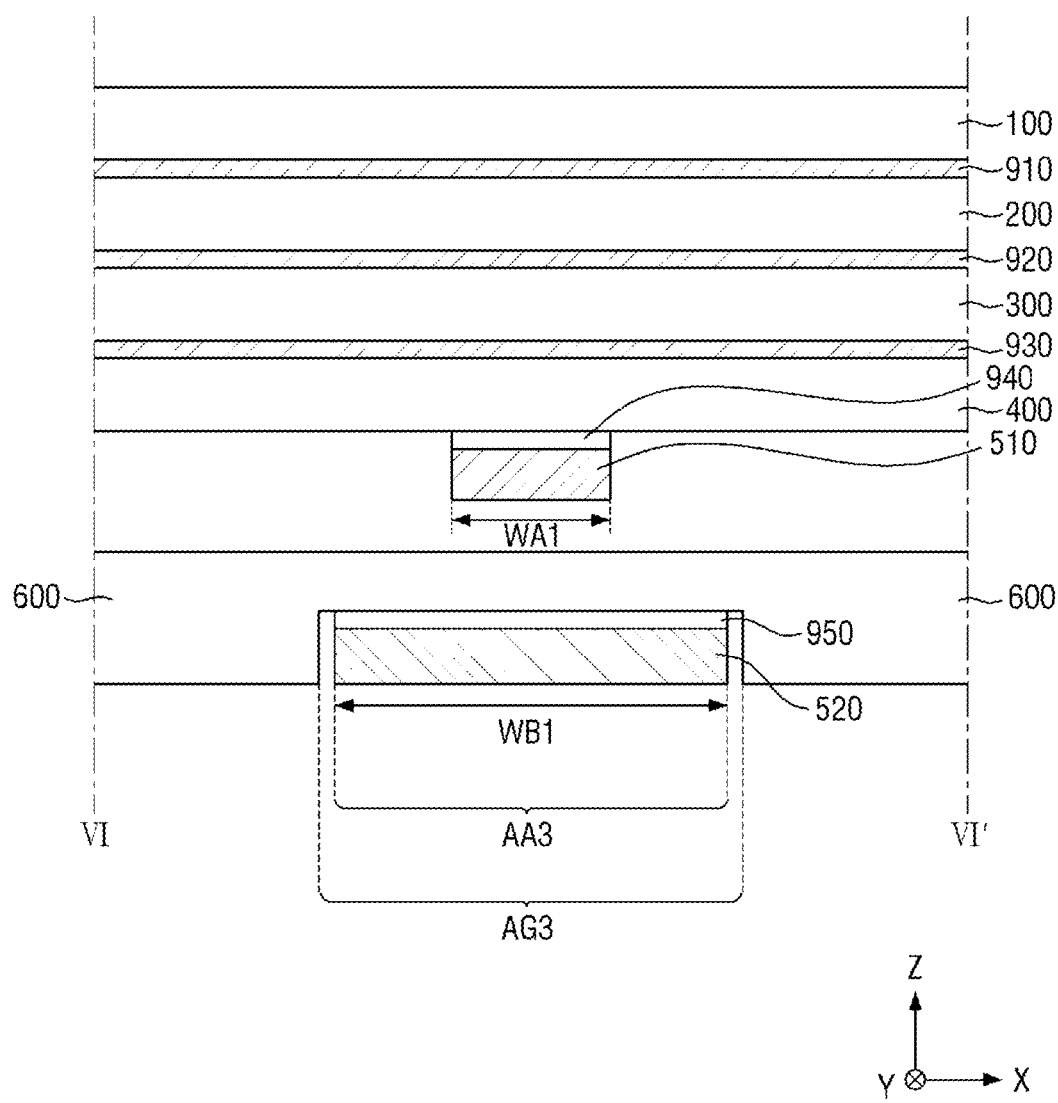

Referring to FIGS. 22 and 23, a first accommodating hole AH1 and a second accommodating hole AH2 are defined through a bracket 600 to be adjacent to each other in the second direction (Y-axis direction) and the bracket 600 may include a third groove area AG3 between the first accommodating hole AH1 and the second accommodating hole AH2. A third attachment area AA3 may be defined by the entire third groove area AG3 to provide a space to which a second vibration generator 520 is attached.

A width of the third groove area AG3 in the first direction X may be greater than or substantially equal to a width WB1 of the second vibration generator 520 in the first direction X. In such an embodiment, a width of the third groove area AG3 in the second direction Y may be greater than or substantially equal to a width WB2 of the second vibration generator 520 in the second direction Y.

Since the third groove area AG3 is thinner than other areas of the bracket 600, vibrations generated by the second vibration generator 520 may be effectively transmitted. In such an embodiment, the second vibration generator 520 can be attached to the bracket 600 through the third groove area AG3 without increasing the thickness of a display device.

In embodiments of the invention, as described above, the second vibration generator 520 outputs vibrations in the vertical direction (Z-axis direction), and the bracket 600 outputs vibrations in the horizontal direction according to the vertical vibration of the second vibration generator 520. In embodiments of FIGS. 24 through 29, the second vibration generator 520 may be attached to a side surface of the bracket 600 to output horizontal vibrations. That is, the second vibration generator 520 may be attached to a side surface of the bracket 600 and may repeatedly contract and expand in the horizontal direction. Although embodiments having a structure in which the second vibration generator 520 is disposed on a side surface of the bracket 600 along the first direction X is illustrated for ease of description, embodiments are not limited to such a structure. In another alternative embodiment, the second vibration generator 520 may be disposed on a side surface of the bracket 600 along the second direction Y.

Figure 24:
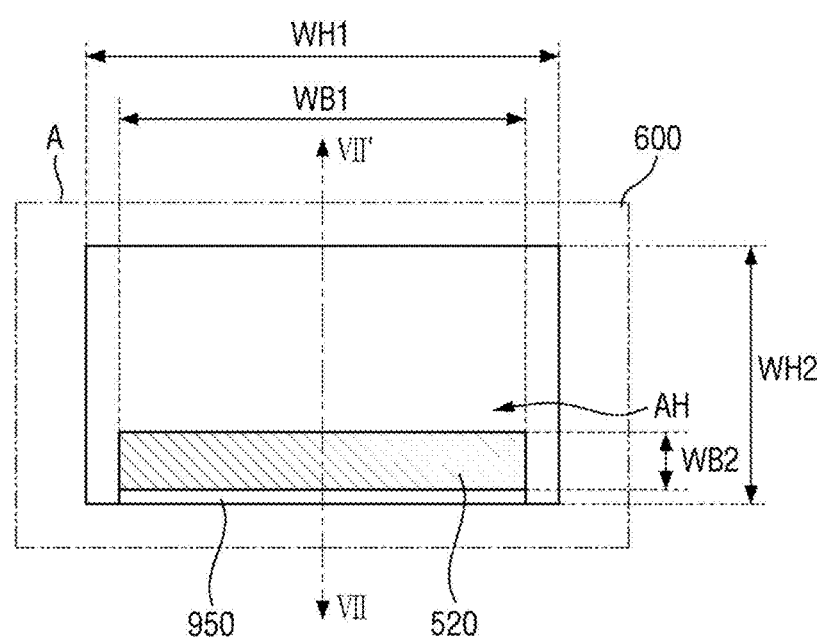
Figure 25:
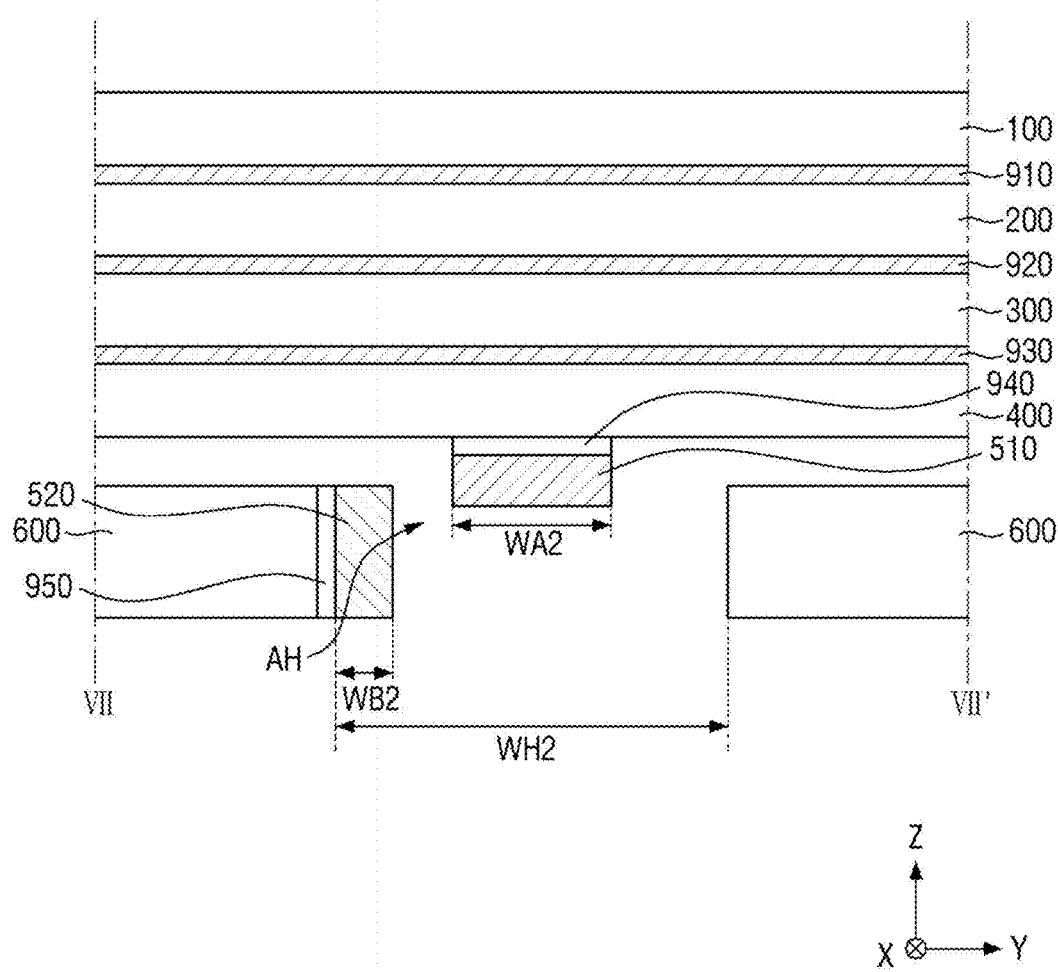

Referring to FIGS. 24 and 25, in such an embodiment, a second vibration generator 520 may be disposed on a side surface of a bracket 600 inside an accommodating hole AH. The second vibration generator 520 attached to the side surface of the bracket 600 may vibrate in the horizontal direction (e.g., the Y-axis direction). Horizontal vibrations output from the second vibration generator 520 may be transmitted to the bracket 600. The bracket 600 may vibrate in the horizontal direction according to the horizontal vibration of the second vibration generator 520 and provide horizontal vibrations to a display device.

In an embodiment, where the second vibration generator 520 is attached to a side surface of the bracket 600 and provides horizontal vibrations, the vibration efficiency may be improved because the horizontal vibrations can be provided directly to the bracket 600.

A thickness WB2 of the second vibration generator 520 may be equal to a thickness of a first vibration generator 510, but may also be greater than the thickness of the first vibration generator 510.

Figure 26:
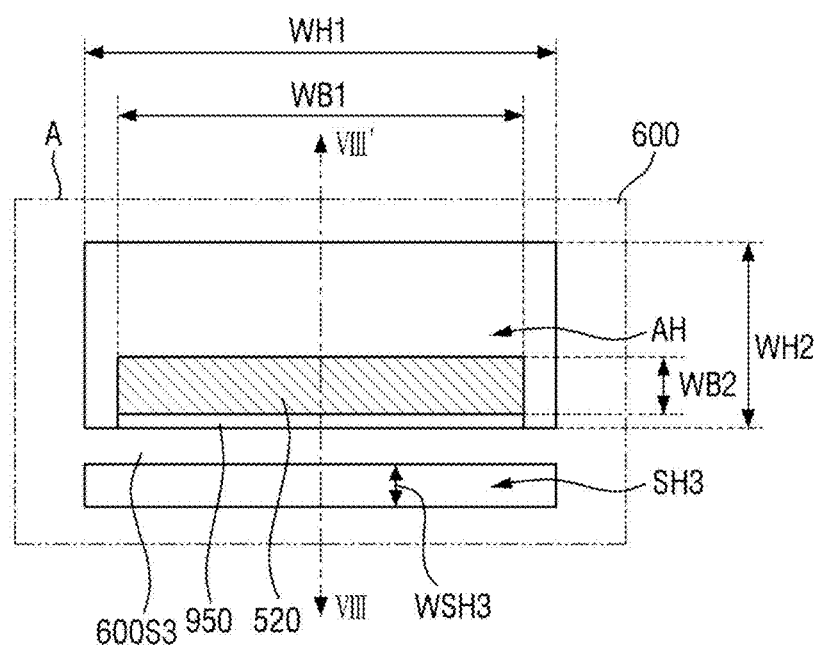
Figure 27:
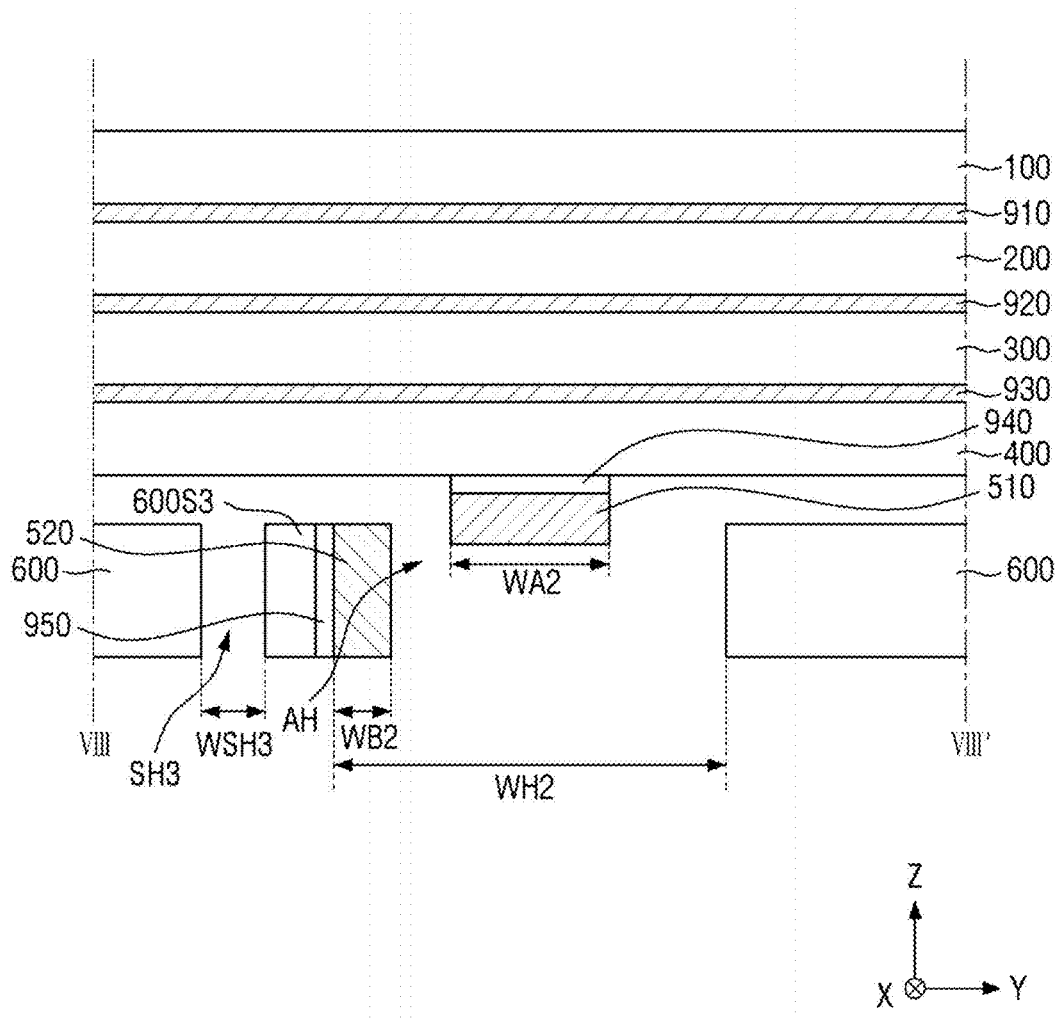

An embodiment of FIGS. 26 and 27 is different from the embodiment of FIGS. 24 and 25 in that a third sub-accommodating hole SH3 is further defined through a bracket 600 to be adjacent to an accommodating hole AH.

The third sub-accommodating hole SH3 may be defined or formed adjacent to a second vibration generator 520 attached to a side surface of the bracket 600 inside the accommodating hole AH. In such an embodiment, a third attachment portion 600S3 of the bracket 600 may be disposed between the accommodating hole AH and the third sub-accommodating hole SH3, and the second vibration generator 520 may be attached to the third attachment portion 600S3. A thickness of the bracket 600 to which the second vibration generator 520 is attached may be reduced by the third sub-accommodating hole SH3, such that vibrations output from the second vibration generator 520 may be effectively transmitted.

Figure 28:
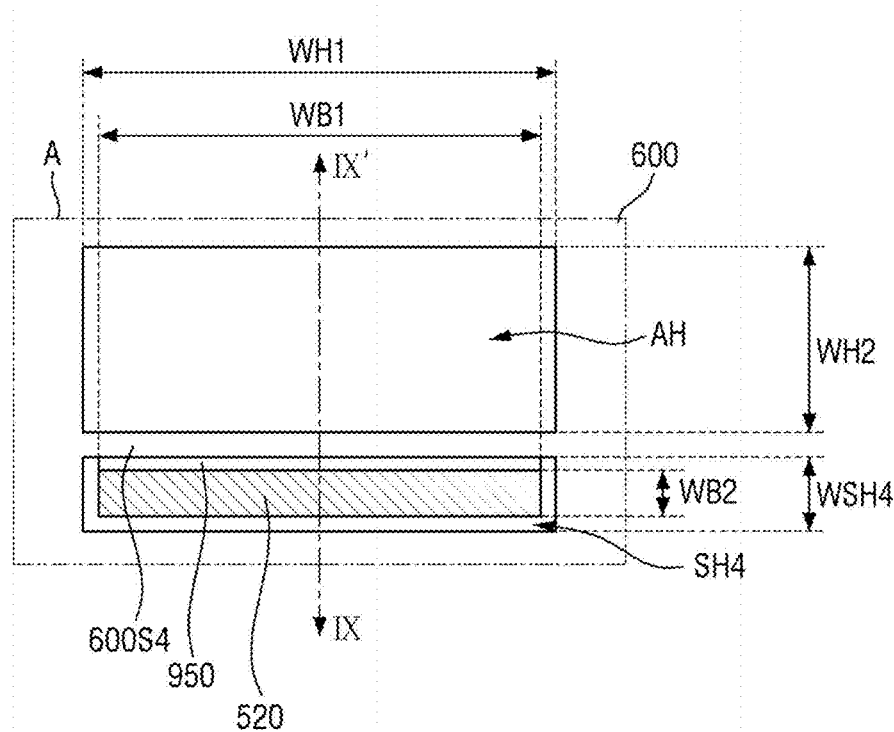
Figure 29:
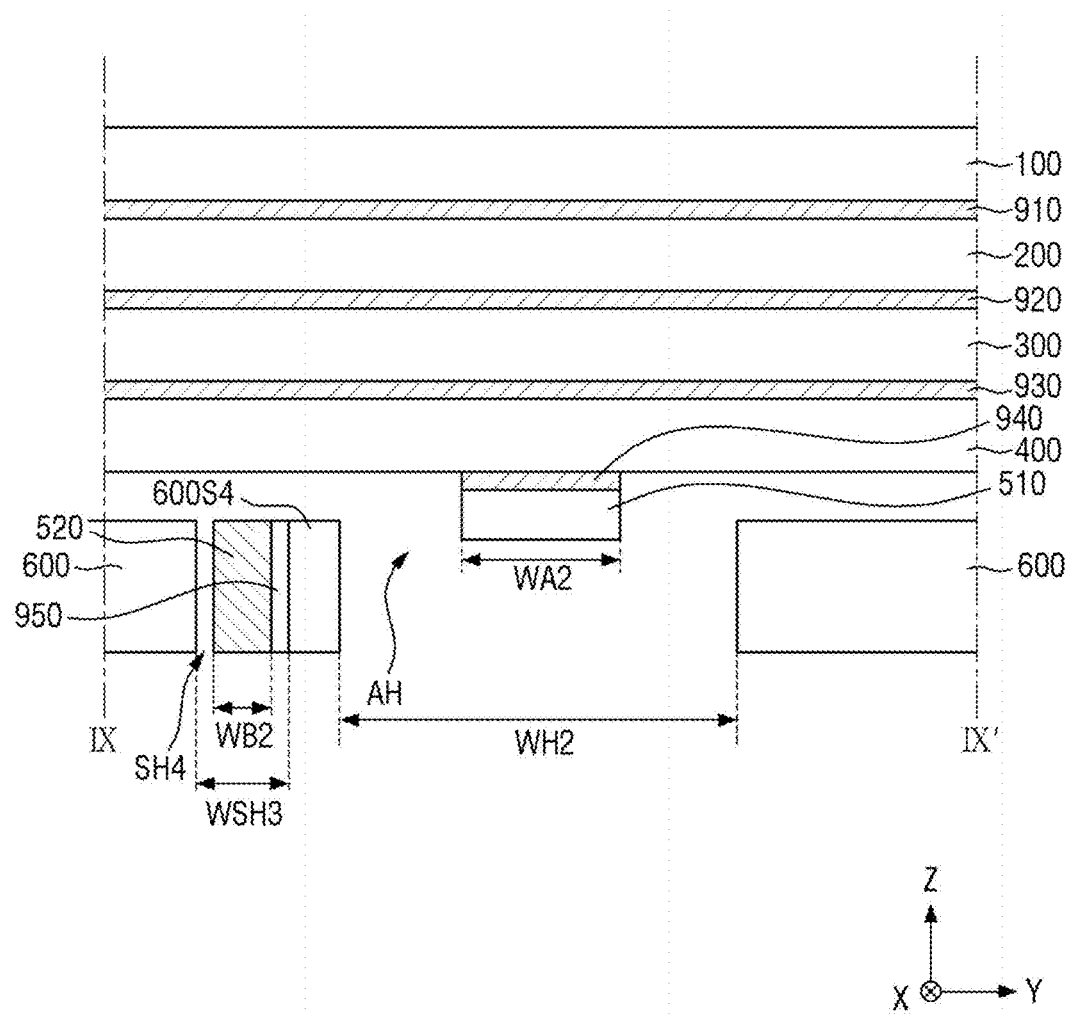

A width WSH3 of the third sub-accommodating hole SH3 in the second direction Y may be, but is not limited to, smaller than a width WH2 of the accommodating hole AH in the second direction Y. In FIGS. 27 and 29, WA2 refers to a width of the first vibration generator 510 in the second direction An embodiment of FIGS. 28 and 29 is different from the embodiment of FIGS. 24 and 25 in that a fourth sub-accommodating hole SH4 is further defined through the bracket 600 to be adjacent to an accommodating hole AH and that a second vibration generator 520 is attached to an inner side surface of the fourth sub-accommodating hole SH4. In such an embodiment, the second vibration generator 520 may be attached to a fourth attachment portion 600S4 between the fourth sub-accommodating hole SH4 and the accommodating hole AH. A width WSH4 of the fourth sub-accommodating hole SH4 in the second direction Y may be greater than a thickness WB2 of the second vibration generator 520.

Figure 30:
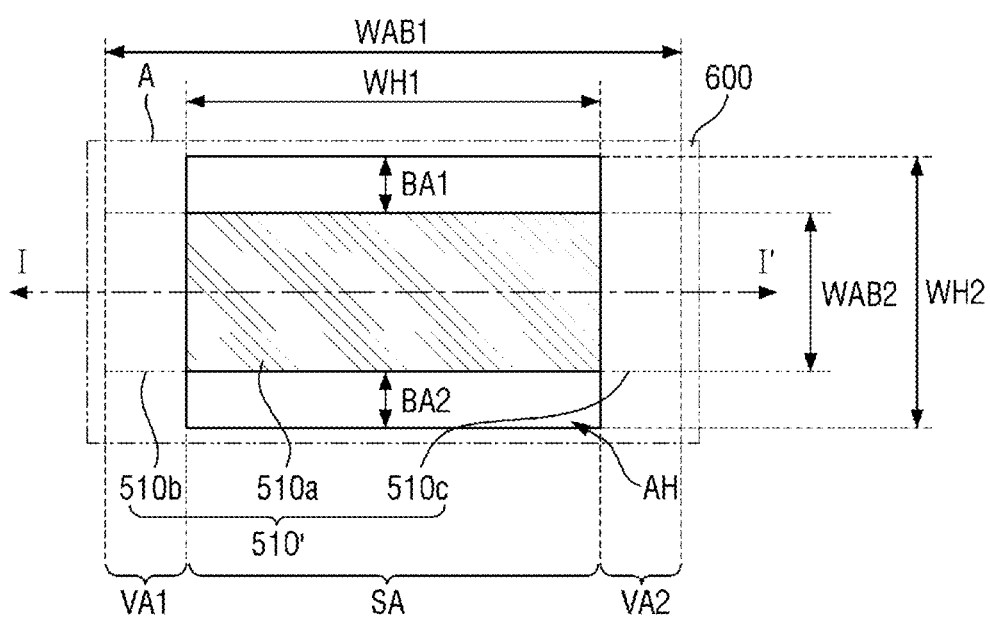
Figure 31:
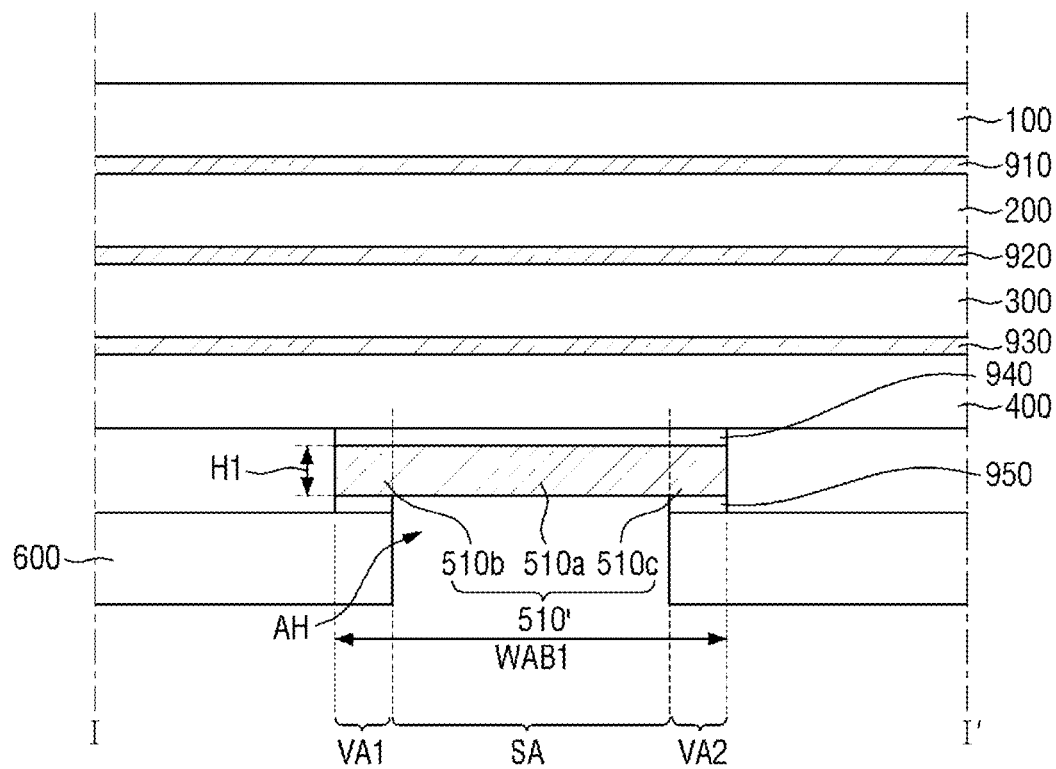

Referring to FIGS. 30 and 31, in another alternative embodiment, a third vibration generator 510' may be disposed between an under-panel member 400 and a bracket 600. The third vibration generator 510' may include vibration areas VA1 and VA2 and a sound area SA.

In an embodiment, as shown in FIGS. 30 and 31, a width WAB1 of the third vibration generator 510' in the first direction X may be greater than the width WH1 of the accommodating hole AH in the first direction X, and a width WAB2 of the third vibration generator 510' in the second direction Y may be less than the width WH2 of the accommodating hole AH in the second direction Y.

The third vibration generator 510' may include a first vibration generating portion 510b attached to the under-panel member 400 and the bracket 600 in a first vibration area VA1, include a second vibration generating portion 510c attached to the under-panel member 400 and the bracket 600 in a second vibration area VA2, and include a sound generating portion 510a attached to the under-panel member 400 in the sound area SA.

The sound generating portion 510a may be attached only to the under-panel member 400 by a fourth adhesive member 940 and may not be attached to the bracket 600. In such an embodiment, the sound generating portion 510a may overlap an accommodating hole AH defined in the bracket 600 when viewed from a plan view in the Z-axis direction. The sound generating portion 510a may vibrate in the vertical direction (Z-axis direction) to vibrate the under-panel member 400 and structures disposed on the under-panel member 400. Accordingly, a display device may output sound.

The first vibration generating portion 510b and the second vibration generating portion 510c may be located at an end portion and another end portion of the third vibration generator 510' and may be attached to the under-panel member 400 by the fourth adhesive member 940 and attached to the bracket 600 by a fifth adhesive member 950. The first vibration generating portion 510b and the second vibration generating portion 510c attached to the bracket 600 may generate vibrations in the vertical direction (Z-axis direction), and areas of the bracket 600 to which the vibration generating portions 510b and 510c are attached may vibrate in the horizontal direction (the X-axis direction or the Y-axis direction) according to the contraction or expansion of the vibration generating portions 510b and 510c.

The sound generating portion 510a may be located between the first vibration generating portion 510b and the second vibration generating portion 510c, and the first vibration generating portion 510b, the sound generating portion 510a and the second vibration generating portion 510c may be sequentially arranged.

A same signal may be transmitted to the first vibration generating portion 510b and the second vibration generating portion 510c. However, a signal different from the signal transmitted to the vibration generating portions 510b and 510c may be transmitted to the sound generating portion 510a. That is, the sound generating portion 510a and the vibration generating portions 510b and 510c may be driven independently of each other. In one embodiment, for example, when the display device outputs sound, a voltage may be applied only to the sound generating portion 510a to allow sound to be output. When the display device outputs vibration, a voltage may be applied only to the vibration generating portions 510b and 510c to allow sound to be output. In such an embodiment, when both sound and vibration are output, a voltage may be applied to each of the sound generating portion 510a and the vibration generating portions 510b and 510c to allow both sound and vibration to be output.

Figure 32:
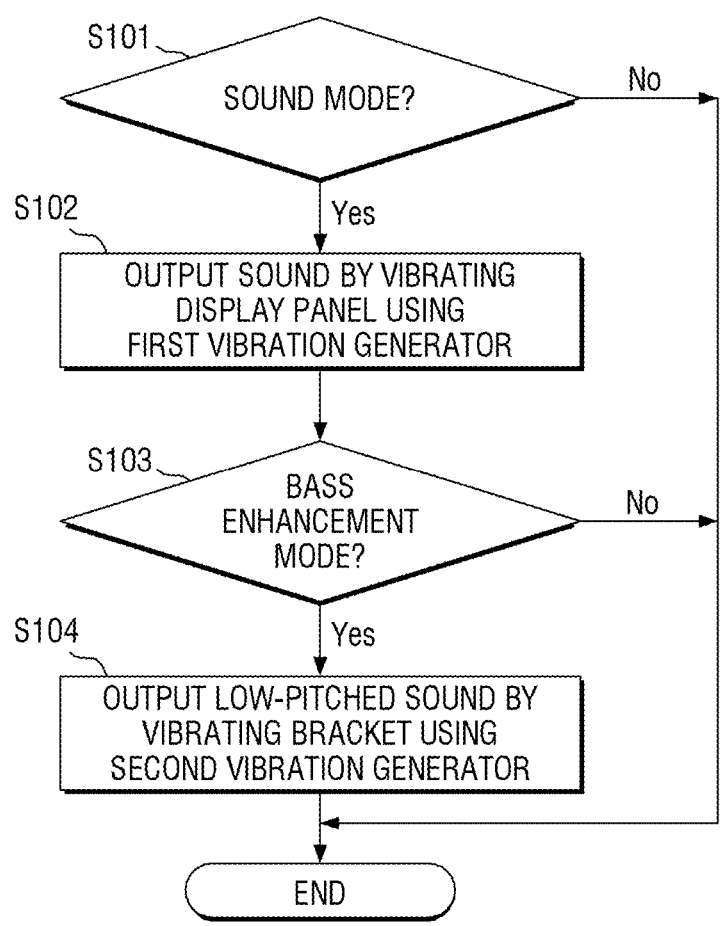
FIG. 32 is a flowchart illustrating a bass enhancement method in a bass enhancement mode.

FIG. 32 is a flowchart illustrating a bass enhancement method in a bass enhancement mode.

Referring to FIG. 32, in an embodiment, a main processor 710 determines whether a display device 10 is operating in a sound output mode. The sound output mode is a mode in which the display device 10 outputs sound by executing an application such as music or video. In such an embodiment, the sound output mode may include a mode in which a user performs a voice call or a video call through the display device 10 by using a mobile communication mode of a main circuit board 700 (operation S101 of FIG. 32).

In such an embodiment, the main processor 710 controls the display device 10 to output sound by vibrating a display panel 300 using a first vibration generator 510 in the sound output mode (operation S102 of FIG. 32).

In such an embodiment, the main processor 710 outputs first vibration data to a vibration driver 760 in the sound output mode. The vibration driver 760 generates a first driving voltage and a second driving voltage corresponding to the first vibration data. The vibration driver 760 outputs the first driving voltage and the second driving voltage to a first electrode 512 and a second electrode 513 of the first vibration generator 510 through a vibration circuit board 530.

The first vibration generator 510 vibrates based on the first vibration voltage and the second vibration voltage. The display panel 300 may vibrate up and down according to the vibration of the first vibration generator 510. Accordingly, the display device 10 may output sound.

In such an embodiment, when the display device 10 operates in the sound output mode, the main processor 710 determines whether the display device 10 is operating in a bass enhancement mode. The bass enhancement mode is a mode for improving the sound quality of the display device 10 by outputting low-pitched sound by vibrating the display device 10 (operation S103 of FIG. 32).

In such an embodiment, the main processor 710 controls the display device 10 to provide low-pitched sound to a user by vibrating a bracket 600 using a second vibration generator 520 in the bass enhancement mode (operation S104 of FIG. 32).

In an embodiment, the main processor 710 outputs the first vibration data to the vibration driver 760 in the bass enhancement mode. The vibration driver 760 may include at least one low pass filter to process the first vibration data. That is, the vibration driver 760 may process the first vibration data into a bass analog signal.

In such an embodiment, the vibration driver 760 may receive the first vibration data which is a digital signal and convert the first vibration data into analog signals through a DSP and a DAC. The analog signals output from the DAC may be converted into a bass analog signal as the analog signals pass through a low pass filter embedded in the vibration driver 760. In such an embodiment, the bass analog signal may include only low-frequency band signals among the analog signals into which the first vibration data has been converted and may not include high-frequency band signals or may be an attenuated signal.

However, the method of generating the bass analog signal is not limited to those described above. In an embodiment, the main processor 710 may output second vibration data to the vibration driver 760 in the bass enhancement mode. The vibration driver 760 may convert the second vibration data into analog signals through the DSP and the DAC, and the analog signals may be the bass analog signal described above. That is, the vibration driver 760 may directly generate a bass analog signal without using the low pass filter.

The vibration driver 760 may transmit the bass analog signal to the second vibration generator 520 through the vibration circuit board 530. The bass analog signal may include a third driving voltage and a fourth driving voltage. In such an embodiment, the second vibration generator 520 may vibrate according to the third driving voltage and the fourth driving voltage, and the bracket 600 to which the second vibration generator 520 is attached may vibrate from side to side according to the vibration of the second vibration generator 520. Since the bracket 600 fixed in the display device 10 vibrates, the whole of the display device 10 may vibrate in the vibration direction of the bracket 600.

Sound output by the second vibration generator 520 may be similar to sound output by the first vibration generator 510 in sound pressure level in a low-frequency region but may be lower in sound pressure level in a high-frequency region. Therefore, the second vibration generator 520 may boost low-pitched sound in the low-frequency region among the sound output by the first vibration generator 510. In such an embodiment, the second vibration generator 520 can improve the sound quality of the display device 10 by outputting low-pitched sound in the bass enhancement mode. In such an embodiment, since the whole of the display device 10 is made to output vibrations by the second vibration generator 520, high-volume low-pitched sound can be output when a separate member including an echoing space is brought into contact with the display device 10.

In embodiments of a display device according to the invention, sound may be provided by vibrating a display panel using a vibration output portion of a vibration generator disposed under the display panel. Therefore, the vibration generator may be utilized as a front speaker. Accordingly, in such embodiment, a front speaker conventionally disposed on a front surface of the display device may be omitted, such that an area where an image is displayed on the front surface of the display device may be increased and reduce cost.

In embodiments of the invention, a display device may be vibrated in the horizontal direction through a vibration generator vibrating in the vertical direction such that noise generation by the display device is suppressed through horizontal vibration.

In embodiments of a display device according to the invention, a vibration generator may function as a vibration generator for sound generation and a vibration generator for horizontal vibration.

In an embodiment of a method of driving a display device according to the invention, a display device may vibrate in the horizontal direction through a vibration generator vibrating in the vertical direction. The display device vibrating in the horizontal direction may output improved low-pitched sound.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel;
a bracket disposed under the display panel;
a first vibration generator disposed under the display panel and entirely covered by the display panel and bracket from being exposed outside the display device, wherein the first vibration generator outputs sound by vibrating the display panel in a thickness direction of the display panel; and
a second vibration generator disposed under the bracket, wherein the second vibration generator outputs horizontal vibrations by vibrating the bracket in a horizontal direction perpendicular to the thickness direction.

2. The display device of claim 1, wherein
an accommodating hole is defined in the bracket, and
the accommodating hole overlaps the first vibration generator.

3. The display device of claim 2, wherein at least a part of the second vibration generator overlaps the accommodating hole.

4. The display device of claim 3, wherein the first vibration generator and the second vibration generator overlap each other.

5. The display device of claim 4, wherein the second vibration generator is disposed under the first vibration generator.

6. The display device of claim 2, wherein
the second vibration generator comprises a first attachment area provided at an end portion of the second vibration generator, a second attachment area provided at another end portion of the second vibration generator, and a hole area disposed between the first attachment area and the second attachment area, and
the second vibration generator overlaps the bracket in the first attachment area and the second attachment area and does not overlap the bracket in the hole area.

7. The display device of claim 6, wherein
the bracket comprises a first groove area which overlap the first attachment area and a second groove area which overlaps the second attachment area, and
the second vibration generator is disposed in the first groove area and the second groove area.

8. The display device of claim 6, wherein
a first sub-accommodating hole is defined in the bracket to be adjacent to a side portion of the accommodating hole,
a second sub-accommodating hole is defined in the bracket to be adjacent to another side portion of the accommodating hole,
the first attachment area is located between the first sub-accommodating hole and the accommodating hole, and
the second attachment area is located between the second sub-accommodating hole and the accommodating hole.

9. The display device of claim 2, wherein the second vibration generator is disposed in the accommodating hole and disposed on a side surface of the bracket to vibrate the bracket in the horizontal direction.

10. The display device of claim 9, wherein
a sub-accommodating hole is defined in the bracket to be adjacent to the accommodating hole,
the bracket comprises an attachment portion between the accommodating hole and the sub-accommodating hole, and
the second vibration generator is disposed on a side surface of the attachment portion.

11. The display device of claim 1, wherein the first vibration generator comprises:
a first electrode to which a first driving voltage is applied;
a second electrode to which a second driving voltage is applied; and
a vibration layer disposed between the first electrode and the second electrode, wherein the vibration layer contracts or expands in response to the first driving voltage applied to the first electrode and the second driving voltage applied to the second electrode.

12. The display device of claim 11, wherein
the first electrode comprises a first stem electrode and first branch electrodes branching from the first stem electrode, and
the second electrode comprises a second stem electrode and second branch electrodes branching from the second stem electrode and extending parallel to the first branch electrodes.

13. The display device of claim 12, wherein the first branch electrodes and the second branch electrodes are alternately disposed in a direction parallel to the first stem electrode.

14. The display device of claim 1, further comprising:
an under-panel member disposed under the display panel, wherein the first vibration generator contacts the under-panel member.

15. A display device comprising:
a display panel;
a bracket disposed under the display panel and comprises an accommodating hole; and
a vibration generator disposed between the display panel and the bracket, and entirely covered by the display panel and bracket from being exposed outside the display device, wherein an entirety of the vibration generator is spaced apart and separated from the bracket, and at least a part of the vibration generator overlaps the accommodating hole,
wherein the vibration generator comprises a sound generating portion and a vibration generating portion,
the sound generating portion outputs sound by vibrating the display panel, and
the vibration generating portion outputs horizontal vibrations by vibrating the bracket.

16. The display device of claim 15, wherein
the sound generating portion does not overlap the bracket, and
the vibration generating portion overlaps the bracket.

17. The display device of claim 16, wherein
the sound generating portion overlaps the accommodating hole, and
the vibration generating portion does not overlap the accommodating hole.

18. The display device of claim 17, wherein
the vibration generating portion comprises a first vibration generating portion and a second vibration generating portion,
the first vibration generating portion is disposed adjacent to an end portion of the sound generating portion, and
the second vibration generating portion is disposed adjacent to another end portion of the sound generating portion.

19. A method of driving a display device, the method comprising:
outputting a first sound by vibrating a display panel using a first vibration generator in a sound output mode; and
providing a second sound by vibrating a bracket disposed under the display panel using a second vibration generator in a bass enhancement mode,
wherein the second sound has a lower pitch than the first sound and
wherein the first vibration generator is entirely covered by the display panel and bracket from being exposed outside the display device.

20. The method of claim 19, wherein the bracket vibrates in a direction perpendicular to a thickness direction of the display panel in the bass enhancement mode.

* * * * *